United States Patent
Griffin et al.

(10) Patent No.: US 12,443,869 B2
(45) Date of Patent: Oct. 14, 2025

(54) LOCAL SERVICES IN QUANTUM ISOLATION ZONES

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

(*) Notice: Subject to any disclaimer, the term of this patent is extended or adjusted under 35 U.S.C. 154(b) by 949 days.

(21) Appl. No.: 17/558,708

(22) Filed: Dec. 22, 2021

(65) Prior Publication Data
US 2023/0196161 A1    Jun. 22, 2023

(51) Int. Cl.
*G06N 10/00* (2022.01)
*G06N 10/40* (2022.01)

(52) U.S. Cl.
CPC ............ *G06N 10/40* (2022.01); *G06N 10/00* (2019.01)

(58) Field of Classification Search
None
See application file for complete search history.

(56) References Cited

U.S. PATENT DOCUMENTS

| | | | |
|---|---|---|---|
| 7,853,011 B2 | 12/2010 | Kuang et al. | |
| 8,018,244 B2 * | 9/2011 | Berkley | G06N 10/20 326/1 |
| 8,174,305 B2 * | 5/2012 | Harris | B82Y 10/00 327/528 |
| 8,885,828 B2 | 11/2014 | Wiseman et al. | |
| 9,294,272 B2 | 3/2016 | Lutkenhaus et al. | |
| 9,495,644 B2 * | 11/2016 | Chudak | G06N 10/60 |
| 9,870,273 B2 | 1/2018 | Dadashikelayeh et al. | |
| 10,733,522 B2 | 8/2020 | Curtis et al. | |
| 11,379,752 B1 | 7/2022 | Griffin et al. | |
| 11,556,835 B1 | 1/2023 | Coady et al. | |
| 11,558,069 B1 | 1/2023 | Sparrow | |
| 11,714,692 B2 * | 8/2023 | Griffin | G06F 9/5044 719/313 |
| 12,229,637 B2 * | 2/2025 | Griffin | G06N 10/40 |
| 2003/0014522 A1 | 1/2003 | McBrearty et al. | |

(Continued)

FOREIGN PATENT DOCUMENTS

| CN | 101888276 | 11/2010 |
|---|---|---|
| CN | 101888276 A | 11/2010 |

(Continued)

OTHER PUBLICATIONS

Arrazola et al., "Quantum Circuits with Many Photons on a Programmable Nanophotonic Chip", arXiv:2103.02109v1, Mar. 3, 2021, 21 pages.

(Continued)

*Primary Examiner* — Maikhanh Nguyen
(74) *Attorney, Agent, or Firm* — Dority & Manning, P.A.

(57) ABSTRACT

A quantum isolation zone (QIZ) controller executing on a quantum computing system, makes a determination to initiate, for a first QIZ of a plurality of different QIZs, a first local service instance of a global service instance that is executing on the quantum computing system, the first QIZ having a first set of qubits associated therewith. The first local service instance is caused to be initiated, and the QIZ controller modifies a local service data structure to indicate that the first local service instance is associated with the first QIZ.

19 Claims, 21 Drawing Sheets

(56) References Cited

U.S. PATENT DOCUMENTS

| | | | |
|---|---|---|---|
| 2008/0274898 A1* | 11/2008 | Johnson | B82Y 10/00 505/190 |
| 2012/0124432 A1 | 5/2012 | Pesetski et al. | |
| 2015/0154147 A1 | 6/2015 | Alboszta et al. | |
| 2017/0140296 A1* | 5/2017 | Kerman | G06N 10/40 |
| 2017/0141286 A1 | 5/2017 | Kerman | |
| 2017/0323195 A1 | 11/2017 | Crawford et al. | |
| 2018/0062764 A1 | 3/2018 | Borrill | |
| 2019/0042971 A1* | 2/2019 | Zou | G06F 9/30 |
| 2019/0042972 A1 | 2/2019 | Zou et al. | |
| 2019/0179530 A1 | 6/2019 | Chen et al. | |
| 2019/0205783 A1 | 7/2019 | Nam et al. | |
| 2019/0332731 A1 | 10/2019 | Chen et al. | |
| 2020/0128063 A1* | 4/2020 | Griffin | H04L 67/289 |
| 2020/0150044 A1 | 5/2020 | Kalkbrenner et al. | |
| 2020/0167515 A1 | 5/2020 | Pednault et al. | |
| 2020/0167685 A1 | 5/2020 | Thom et al. | |
| 2020/0184031 A1 | 6/2020 | Horii | |
| 2020/0201655 A1 | 6/2020 | Griffin et al. | |
| 2020/0394544 A1 | 12/2020 | Low et al. | |
| 2021/0097419 A1 | 4/2021 | Limberg et al. | |
| 2021/0124640 A1 | 4/2021 | Nickerson et al. | |
| 2021/0152189 A1 | 5/2021 | Murali et al. | |
| 2021/0312047 A1* | 10/2021 | Chen | H04L 9/0858 |
| 2021/0374583 A1 | 12/2021 | Griffin et al. | |
| 2021/0406748 A1 | 12/2021 | Coady et al. | |
| 2022/0094341 A1 | 3/2022 | Pellerano et al. | |
| 2022/0164253 A1 | 5/2022 | On et al. | |
| 2022/0383171 A1 | 12/2022 | Griffin et al. | |
| 2022/0383172 A1 | 12/2022 | Griffin et al. | |
| 2022/0383176 A1 | 12/2022 | Griffin et al. | |
| 2023/0153148 A1 | 5/2023 | Griffin et al. | |

FOREIGN PATENT DOCUMENTS

| | | |
|---|---|---|
| CN | 107317676 | 5/2020 |
| CN | 107317676 B | 5/2020 |
| CN | 108960435 | 6/2020 |
| CN | 108960435 B | 6/2020 |
| KR | 102231130 | 3/2021 |
| KR | 102231130 B1 | 3/2021 |
| WO | 2020081805 A1 | 4/2020 |
| WO | WO2020081805 | 4/2020 |

OTHER PUBLICATIONS

Gay et al., "Communicating Quantum Processes", Proceedings of the Thirty-Second Association for Computing Machinery SIGPLAN-SIGACT Symposium on Principles of Programming Languages, Long Beach California, California, United Stats, Jan. 12-14, 2005, pp. 145-157.

Goyal, "Using Graph States for Quantum Computation and Communication", Thesis in Partial Fulfillment of the Requirements for the Degree of Doctor of Philosophy, California Institute of Technology, Pasadena, California, May 27, 2009, 95 pages.

Goyeneche et al., "Genuinely Multipartite Entangled States and Orthogonal Arrays", arXiv:1404.3586v2, Jul. 18, 2014, 24 pages.

Hahn et al., "Quantum Network Routing and Local Complementation", Quantum Information, vol. 5, No. 76, Sep. 2019, Nature Partner Journals, 7 pages.

Honrubia et al., "Graph Approach to Quantum Teleportation Dynamics", Quantum Reports, vol. 2, Jul. 2020, MDPI, pp. 352-377.

Milna et al., "EntangleNet: Theoretical Reestablishment of Entanglement in Quantum Networks", Applied Sciences, vol. 8, Oct. 2018, No. 1935, MDPI, 17 pages.

Non-Final Office Action for U.S. Appl. No. 17/530,121, dated May 2, 2024, 20 pages.

Notice of Allowance for U.S. Appl. No. 17/538,211, dated Jun. 20, 2024, 19 pages.

Notice of Allowance for U.S. Appl. No. 17/552,594, dated Jun. 26, 2024, 18 pages.

Saggio et al., "Experimental Quantum Speed-Up in Reinforcement Learning Agents", arXiv:2103.06294v1, Mar. 10, 2021, 10 pages.

Salazar et al., "Optimal Allocation of Quantum Resources", arXiv:2006.16134v2, Jul. 5, 2020, 13 pages.

Stahlke et al., "Quantum Zero-Error Source-Channel Coding and Non-Commutative Gaph Theory", arXiv: 1405.5254v2, Oct. 18, 2015, 24 pages.

Notice of Allowance for U.S. Appl. No. 17/538,211, dated Oct. 9, 2024, 9 pages.

Notice of Allowance for U.S. Appl. No. 17/552,594, dated Oct. 17, 2024, 9 pages.

Final Office Action for U.S. Appl. No. 17/530,121, dated Nov. 1, 2024, 15 pages.

Arrazola, J.M. et al., "Quantum circuits with many photons on a programmable nanophotonic chip," arXiv:2103.02109v1 [quant-ph], Mar. 3, 2021, 21 pages.

Goyal, K., "Using Graph States for Quantum Computation and Communication," Thesis In Partial Fulfillment of the Requirements for the Degree of Doctor of Philosophy, California Institute of Technology, Pasadena, California, May 27, 2009, 95 pages.

Goyeneche, D. et al., "Genuinely multipartite entangled states and orthogonal arrays," arXiv:1404.3586v2 [quant-ph], Jul. 18, 2014, 24 pages.

Hahn, F. et al., "Quantum network routing and local complementation," Quantum Information, vol. 5, No. 76, Sep. 2019, Nature Partner Journals, 7 pages.

Honrubia, E. et al., "Graph Approach to Quantum Teleportation Dynamics," Quantum Reports, vol. 2, Jul. 2020, MDPI, pp. 352-377.

Milna, M. et al., "EntangleNet: Theoretical Reestablishment of Entanglement in Quantum Networks," Applied Sciences, vol. 8, Oct. 2018, No. 1935, MDPI, 17 pages.

Saggio, V. et al., "Experimental quantum speed-up in reinforcement learning agents," arXiv:2103.06294v1 [quant-oh], Mar. 10, 2021, 10 pages.

Salazar, R. et al., "Optimal allocation of quantum resources," arXiv:2006.16134v2 [quant-ph], Jul. 5, 2020, 13 pages.

Stahlke, D. et al., "Quantum zero-error source-channel coding and non-commutative graph theory," arXiv:1405.5254v2 [quant-ph], Oct. 18, 2015, 24 pages.

Non-Final Office Action for U.S. Appl. No. 17/530,121, dated Mar. 14, 2025, 19 pages.

* cited by examiner

| QUBIT REGISTRY | | | | | | | |
|---|---|---|---|---|---|---|---|
| TOT. QUBITS: 2 _106_ | | | | | | | |
| TOT. AVAIL QUBITS: 2 _108_ | | | | | | | |
| _110_ | | | | | | | |
| QUBIT METADATA _112_ | | | | | | | |
| | QID _29_ | SAS _30_ | QIZID _32_ | QIZAS _34_ | PROC _36_ | PAR _38_ | CHLD _40_ | MD _42_ | LS _104_ |
| 114-1 | Q3 | NA | Z1A | A | NULL | NULL | NULL | XXX | N |
| 114-2 | Q4 | NA | Z1A | A | NULL | NULL | NULL | XXX | N |

*FIG. 6D*

| | | 29 | 30 | 32 | 34 | 36 | 38 | 40 | 42 | 104 |
|---|---|---|---|---|---|---|---|---|---|---|
| | QID | SAS | QIZID | QIZAS | PROC | PAR | CHLD | MD | LS |
| 114-1 | Q3 | NA | Z1A | NA | NA | NULL | NULL | XXX | N |
| 114-2 | Q4 | NA | Z1A | A | NULL | NULL | NULL | XXX | N |

TOT. QUBITS: 2 — 108
TOT. AVAIL QUBITS: 1 — 110
QUBIT REGISTRY — 106
QUBIT METADATA — 112

FIG. 6F

LOCAL SERVICES IN QUANTUM ISOLATION ZONES

BACKGROUND

Quantum computing utilizes qubits to perform quantum calculations. Qubits are finite resources. As quantum computing continues to increase in popularity and become more commonplace, an ability to programmatically coordinate access to qubits will be desirable.

SUMMARY

The examples disclosed herein implement local services in quantum isolation zones (QIZs). In particular, in response to a request, a criterion, or some other trigger, a QIZ controller initiates a local service of a global service provided on the quantum computing system to provide service for a QIZ.

In one example a method is provided. The method includes making, by a QIZ controller executing on a quantum computing system, a determination to initiate, for a first QIZ of a plurality of different QIZs, a first local service instance of a global service instance that is executing on the quantum computing system, the first QIZ having a first set of qubits associated therewith. The method further includes causing, by the QIZ controller, the first local service instance to be initiated. The method further includes modifying, by the QIZ controller, a local service data structure to indicate that the first local service instance is associated with the first QIZ.

In another example a quantum computing system is provided. The quantum computing system includes a memory, and a processor device coupled to the memory. The processor device is to make a determination to initiate, for a first QIZ of a plurality of different QIZs, a first local service instance of a global service instance that is executing on the quantum computing system, the first QIZ having a first set of qubits associated therewith. The processor device is further to cause the first local service instance to be initiated. The processor device is further to modify a local service data structure to indicate that the first local service instance is associated with the first QIZ.

In another example a non-transitory computer-readable storage medium is provided. The non-transitory computer-readable storage medium includes executable instructions to cause a processor device on a quantum computing system to make a determination to initiate, for a first QIZ, a first local service instance of a global service instance, the first QIZ having a first set of qubits associated therewith. The instructions further cause the processor device to cause the first local service instance to be initiated. The instructions further cause the processor device to modify a local service data structure to indicate that the first local service instance is associated with the first QIZ, and route a service request to the first local service instance.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 6A-6F illustrate the environment illustrated in FIGS. 3 and 5 according to another implementation;

DETAILED DESCRIPTION

Figure 1A:
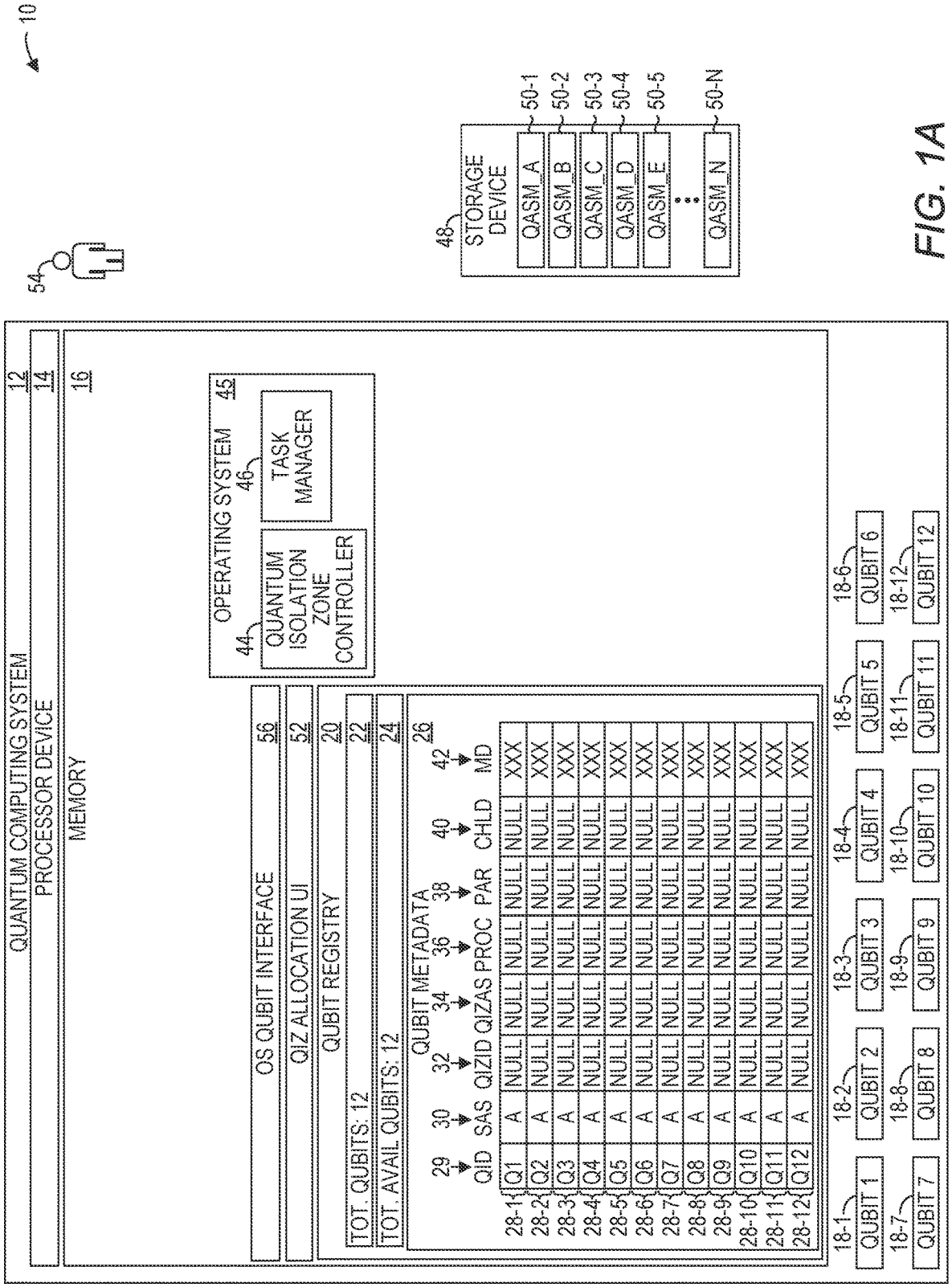
FIGS. 1A-1F are block diagrams of an environment, at successive points in time, in which quantum isolation zones (QIZs) can be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources, but as the technology evolves, quantum computing systems are implementing larger and larger numbers of qubits. As quantum computing continues to increase in popularity and become more commonplace, it is increasingly important for the operating system to control access to qubits to, for example, ensure that one quantum process does not inadvertently access a qubit utilized by another quantum process, ensure that qubits containing private information can only be accessed by quantum processes that should have access to such private information, and to generally isolate one quantum process from another quantum process.

The examples disclosed herein implement quantum isolation zones (QIZs) that ensure a quantum process can only access qubits allocated to the QIZ in which the quantum process executes, and has no visibility to or ability to access qubits allocated to other QIZs or that are otherwise implemented on the quantum computing system. The examples also implement quantum process relationship graphs that facilitate visibility of qubits by a plurality of quantum processes that execute within a QIZ and that have relationships with one another. A first quantum process executing in a QIZ that is not related to a second quantum process executing in the same QIZ has no visibility to the qubits allocated to the second quantum process. Thus, the examples facilitate isolation even within the same QIZ, or qubit sharing within the same QIZ among related quantum processes.

Additional examples disclosed herein implement local services in QIZs. In particular, in response to a request, a criterion, or some other trigger, a local service instance of a global service provided on the quantum computing system may be initiated for a QIZ. The implementation of local services in a QIZ eliminates an otherwise single-threaded nature of a global service and thus implements scalability on the quantum computing system as the numbers of qubits and QIZs implemented by the quantum computing system increase in quantity.

In one example a QIZ controller may make a determination to initiate, for a QIZ, a local service instance of a global service instance that is executing on the quantum computing system. The QIZ controller may initiate the local service instance based on a request, a criterion, or some other trigger. The QIZ controller modifies a local service data structure to indicate that the local service is associated with the QIZ. Subsequent requests by quantum processes associated with the QIZ for services implemented by the global service are routed by the QIZ controller to the local service in a manner that is transparent to the service requestor, reducing the load on the global service and decreasing the amount of time it would otherwise take to respond to the request.

FIGS. 1A-1F are block diagrams of an environment, at successive points in time, in which QIZs can be practiced according to one implementation. Referring first to FIG. 1A, an environment 10 includes a quantum computing system 12 that operates in a quantum environment but can operate using classical computing principles or quantum computing principles. When using quantum computing principles, the quantum computing system 12 performs computations that utilize quantum-mechanical phenomena, such as superposition and entanglement. The quantum computing system 12 may operate under certain environmental conditions, such as at or near 0° Kelvin. When using classical computing principles, the quantum computing system 12 utilizes binary digits that have a value of either 1 or 0.

The quantum computing system 12 includes at least one processor device 14 and at least one memory 16. The quantum computing system 12 implements twelve qubits 18-1-18-12 (generally, qubits 18). The quantum computing system 12 includes a qubit registry 20 that maintains information about the qubits 18-1-18-12, including, by way of non-limiting example, a total qubits counter 22 that identifies the total number of qubits 18 implemented by the quantum computing system 12 and a total available qubits counter 24 that maintains count of the total number of qubits 18 that are currently available for allocation.

The qubit registry 20 also maintains qubit metadata 26, which comprises a plurality of metadata records 28-1-28-12 (generally, metadata records 28), each of which maintains information about a corresponding qubit 18-1-18-12. Each metadata record 28 includes a qubit identifier (QID) 29 that contains an identifier of the qubit 18-1-18-12 to which the respective metadata record 28 corresponds, a system availability status (SAS) 30 that identifies whether the corresponding qubit 18 is available for allocation at the quantum computing system level, a QIZ identifier (QIZID) 32 that identifies the QIZ, if any, to which the corresponding qubit 18 has been allocated, and a QIZ availability status (QIZAS) 34 that identifies whether the corresponding qubit 18, if allocated to a QIZ, is available in the QIZ or has been allocated to a quantum process executing in the QIZ. Each metadata record 28 also includes a process identifier 36 of the quantum process, if any, to which the corresponding qubit 18 has been allocated, a parent identifier 38 that identifies a parent quantum process, if any, of the quantum process to which the corresponding qubit 18 has been assigned, and a child identifier 40 that identifies a child quantum process, if any, of the quantum process to which the corresponding qubit 18 has been assigned. Each metadata record 28 may also include additional metadata 42 not relevant to the examples disclosed herein, such as metadata indicating a real-time state of the corresponding qubit 18, such as whether the qubit 18 is in an entangled state, is in superposition, or the like. While solely for purposes of illustration the quantum computing system 12 is described as having only twelve qubits 18, it is apparent that the quantum computing system 12 may have hundreds or thousands of qubits 18 in some implementations.

At the point in time illustrated in FIG. 1A, the qubits 18 are unallocated, and thus, the system availability status 30 for each metadata record 28 has a value of "A" indicating that the corresponding qubit 18 is available. The values of the other fields in the metadata records 28 are "NULL", which can comprise any value that indicates that the field is empty.

The quantum computing system 12 includes a QIZ controller 44 that, as described in greater detail below, operates to establish QIZs in which quantum processes execute and have access to allocated qubits 18, but no access or only controlled access to qubits 18 allocated to other QIZs. The QIZ controller 44 may be an operating system component, such as a kernel module or the like, of an operating system 45. The QIZ controller 44 may run at a ring 0 level of the processor device 14 and thus execute in a kernel mode and a kernel space rather than as a user process in a user space. The quantum computing system 12 includes a task manager 46 that is configured to initiate a quantum process from a quantum program file, such as a quantum assembly language (QASM) file, or the like. In this example, a storage device 48 contains a plurality of QASM files 50-1-50-N, each of which includes quantum programming instructions that, when executed, implement a desired functionality.

The quantum computing system 12 may include a QIZ allocation user interface (UI) 52 that allows an operator 54 to interact with the QIZ controller 44 to establish a QIZ. The quantum computing system 12 may also include an operating system (OS) qubit interface 56 that is invoked when a quantum process attempts to read, write, or otherwise query a qubit 18. The OS qubit interface 56, in turn, communicates with the QIZ controller 44, or, in other implementations, the QIZ controller 44 may be integrated with the OS qubit interface 56.

Assume that the QIZ controller 44 receives a request from a requestor to allocate a first group of qubits 18 from available qubits 18 to establish a first QIZ that limits visibility of any quantum process associated with the first QIZ to only the qubits 18 in the first group of qubits 18. The request may identify the number of qubits 18 and, if applicable, other criteria, such as a particular type of qubit, or any other desired characteristics of the qubits 18.

In one example, the requestor may be the QIZ allocation UI 52 which makes the request in response to input from the operator 54. In another example, the request may be a programmatic request from a process executing on the quantum computing system 12 or elsewhere. In this example, the request indicated that six qubits 18 were to be allocated to the QIZ. The request may come directly to the QIZ controller 44, or indirectly via the OS qubit interface 56. The QIZ controller 44 accesses the qubit metadata 26 and identifies six qubits 18 that have a system availability status 30 that indicates the qubits 18 are available. In this example, the QIZ controller 44 determined that the six qubits 18-1-18-6 were available based on the system availability status 30 of the metadata records 28-1-28-6.

Figure 1B:
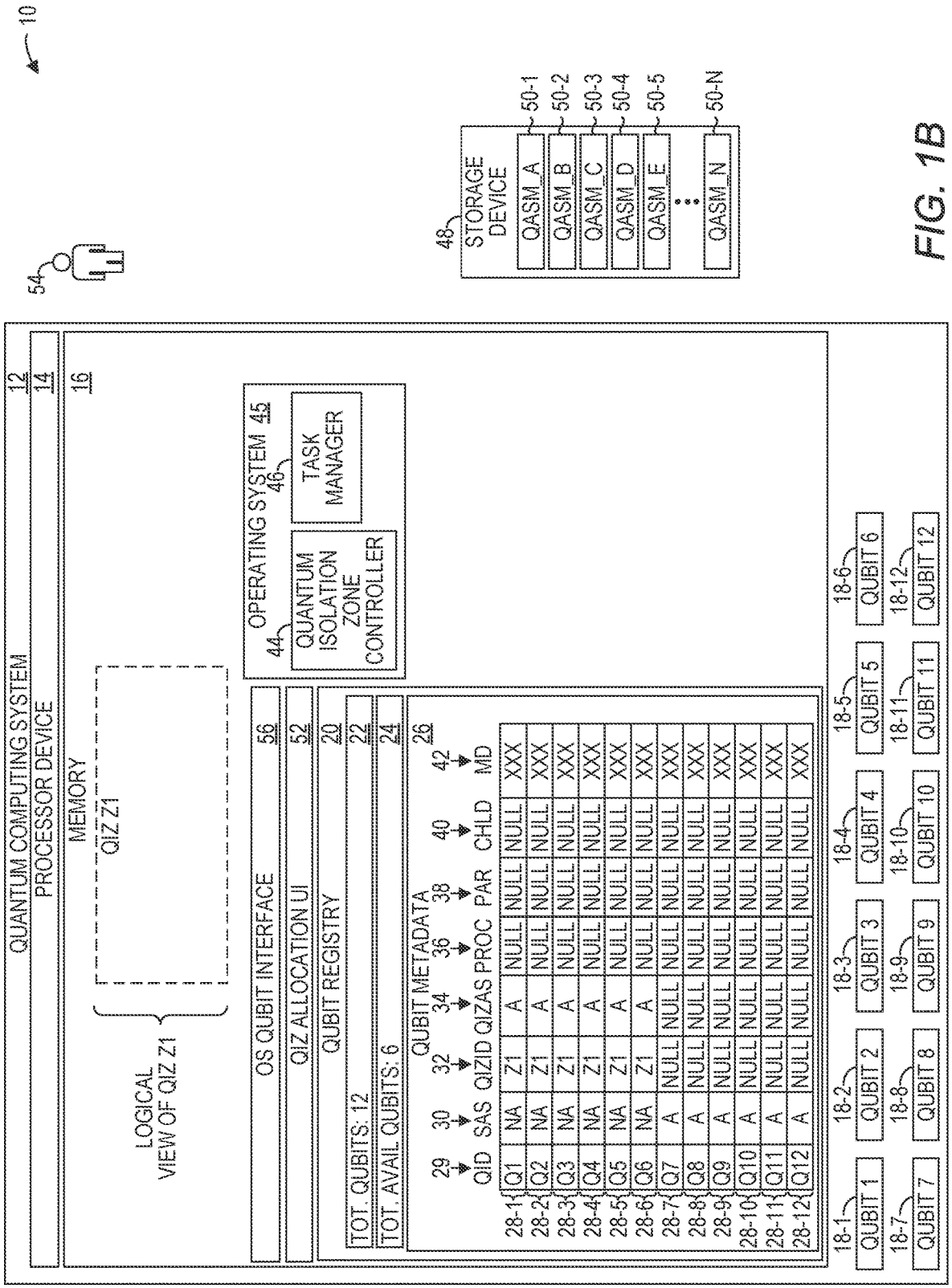

Referring now to FIG. 1B, the QIZ controller 44 modifies the system availability status 30 of the metadata records 28-1-28-6 with a value of "NA" (not available) to indicate that the six qubits 18-1-18-6 are no longer available for allocation. The QIZ controller 44 obtains a unique QIZ identifier, in this example, "Z1", and modifies the QIZ ID 32 to indicate that the qubits 18-1-18-6 have been allocated to the QIZ Z1. The QIZ controller 44 may generate the unique QIZ ID or be provided the unique QIZ ID by the requestor or some other mechanism. The QIZ controller 44 modifies the QIZ availability status 34 to indicate that the qubits 18-1-18-6 are available for allocation within the QIZ Z1. The QIZ controller 44 modifies the total available qubits counter 24 to indicate that six qubits 18 (i.e., qubits 18-7-18-12) are now available for allocation to a QIZ.

For purposes of illustration, a logical QIZ Z1 is illustrated in dashed lines in the Figures to facilitate an understanding of the isolation and relationship aspects of QIZs implemented by the examples herein. However, it should be understood that the QIZ Z1 illustrated in the Figures in dashed outline is a logical depiction only provided for ease of understanding and that the functionality of the QIZ Z1 is implemented via the QIZ controller 44, the qubit metadata 26, and other components as described herein.

Assume that the task manager 46 receives a request to initiate a quantum process based on the QASM file 50-1 into the QIZ Z1. The request may be contained in a schedule, may be received programmatically, or may be initiated via input from the operator 54. The task manager 46 may access the QASM file 50-1 and parse the QASM file 50-1 to determine that, during execution, a quantum process initiated from the QASM file 50-1 will utilize two qubits 18. In other implementations, the number of qubits 18 to be allocated to the quantum process may be contained in the request to initiate the quantum process. The task manager 46 sends a request to the QIZ controller 44 for an allocation of two qubits 18 from the QIZ Z1. The QIZ controller 44 receives the request to allocate two qubits 18 in the QIZ Z1 to a quantum process that is, or will be, associated with the QIZ Z1. Based on the metadata records 28, the QIZ controller 44 determines that the qubits 18-1 and 18-2 are available for allocation within the QIZ Z1.

Figure 1C:
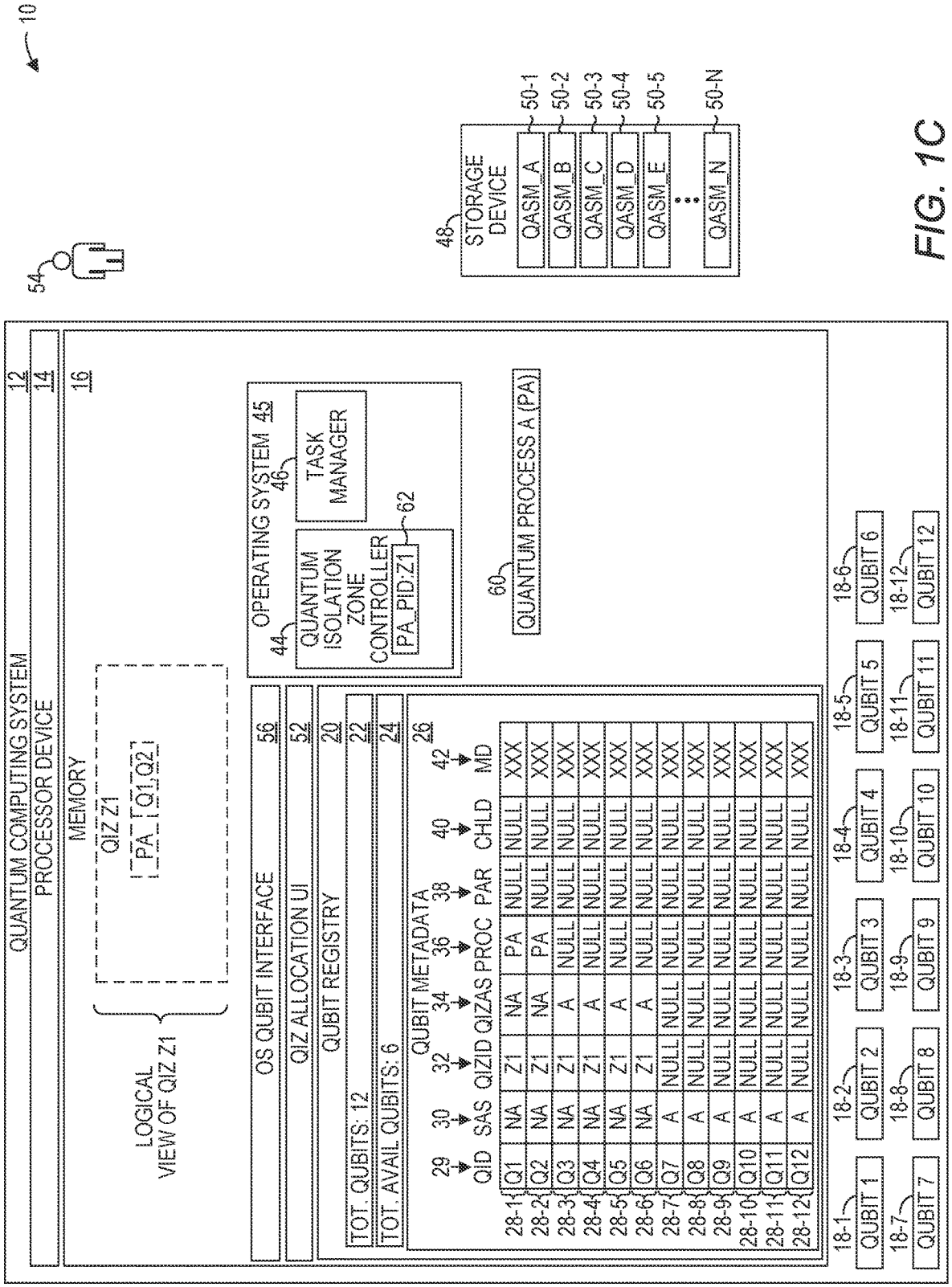

Referring now to FIG. 1C, the QIZ controller 44 modifies the QIZ availability status 34 of the metadata records 28-1 and 28-2 to indicate that the corresponding qubits 18-1 and 18-2 have been allocated and thus are no longer available for allocation (e.g., "NA"). The QIZ controller 44 provides the qubit IDs of the qubits 18-1 and 18-2 to the task manager 46. The task manager 46 initiates a quantum process 60 ("PA") into the QIZ Z1 with location/address information of the qubits 18-1 and 18-2. The task manager 46 provides a unique program ID (PID) of the quantum process 60 ("PA_PID") to the QIZ controller 44. The QIZ controller 44 maintains a mapping record 62 that maps the PID to the QIZ Z1. The quantum process 60 is now said to "execute in" or be "associated with" the QIZ Z1, because the visibility of and access to the qubits 18-1-18-12 is now constrained by the QIZ Z1.

As an example, assume that, at the point in time illustrated in FIG. 1C, the quantum process 60 issues a request to the OS qubit interface 56 to obtain a list of qubit IDs of all qubits 18 to which the quantum process 60 has access (i.e., read access and/or write access) or which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, and that the four qubits 18-3-18-6 are available. Because the qubits 18-1 and 18-2 have already been allocated to the quantum process 60, and the four qubits 18-3-18-6 are available, the QIZ controller 44 returns the qubit IDs of the qubits 18-1-18-6 to the quantum process 60 via the OS qubit interface 56, indicating that the quantum process 60 has access to the qubits 18-1 and 18-2 and that the qubits 18-3-18-6 are available for allocation. Thus, from the perspective of the quantum process 60, the quantum computing system 12 contains four available qubits 18, and the quantum process 60 is unaware of and unable to access (e.g., is isolated from) the actual additional available qubits 18-7-18-12.

Assume that, in response to the information that the qubits 18-3-18-6 are available, the quantum process 60 issues a request to the OS qubit interface 56 to have an additional qubit 18 allocated to the quantum process 60. The OS qubit interface 56 provides the request to the QIZ controller 44. The QIZ controller 44 then selects one of the qubits 18-3-18-6, modifies the appropriate metadata record 28 to indicate the qubit 18 is now allocated to the quantum process 60, and returns information to the quantum process 60 identifying the allocated qubit 18. Note that this is merely an example of a potential action that the quantum process 60 may take, and is thus not reflected in the metadata records 28 illustrated in FIG. 1C.

Figure 1D:
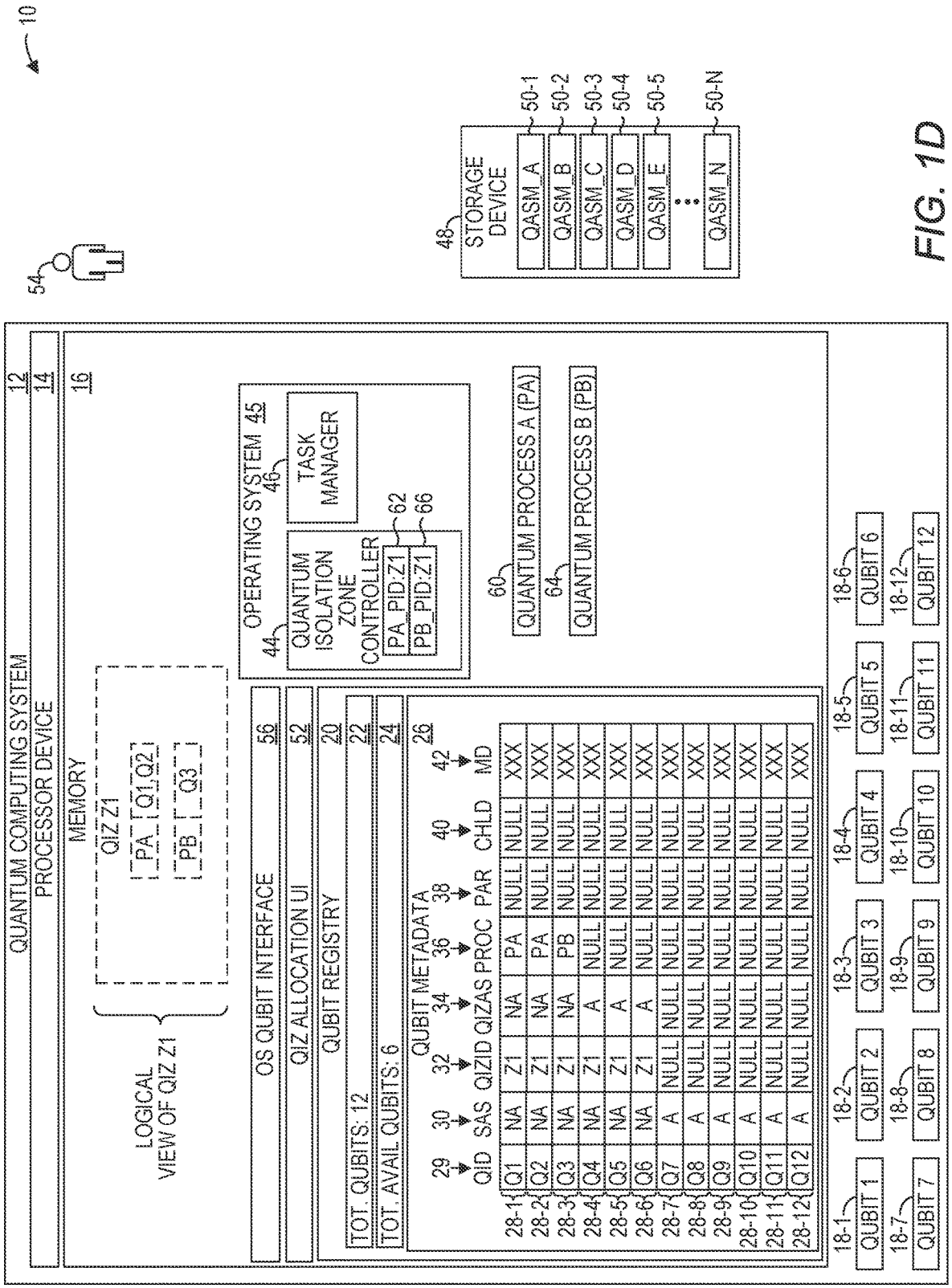

Assume that the task manager 46 receives a request to initiate a quantum process based on the QASM file 50-2 into the QIZ Z1. The task manager 46 may access the QASM file 50-2 and parse the QASM file 50-2 to determine that, during execution, the quantum process will utilize one qubit 18. The task manager 46 sends a request to the QIZ controller 44 for an allocation of one qubit 18 from the QIZ Z1. The QIZ controller 44 receives the request to allocate one qubit in the QIZ Z1 to a quantum process that is, or will be, associated with the QIZ Z1. Based on the metadata records 28, the QIZ controller 44 determines that the qubit 18-3 is available for allocation within the QIZ Z1. Referring now to FIG. 1D, the QIZ controller 44 modifies the QIZ availability status 34 of the metadata record 28-3 to indicate that the corresponding qubit 18-3 has been allocated and thus is no longer available for allocation (e.g., "NA").

The QIZ controller 44 provides the qubit ID of the qubit 18-3 to the task manager 46. The task manager 46 initiates a quantum process 64 ("PB") into the QIZ Z1 with location information of the qubit 18-3. The task manager 46 provides a unique PID of the quantum process 64 ("PB_PID") to the QIZ controller 44. The QIZ controller 44 maintains a mapping record 66 that maps the PID to the QIZ Z1. The quantum process 64 is now said to "execute in" or be "associated with" the QIZ Z1.

Assume that, at the point in time illustrated in FIG. 1D, subsequent to the allocation of the qubit 18-3 to the quantum process 64, the quantum process 60 issues a request to the OS qubit interface 56 to obtain a list of qubit IDs of all qubits 18 to which the quantum process 60 has access (i.e., read access and/or write access) and which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, the qubit 18-3 has been allocated to the quantum process 64, and that the three qubits 18-4-18-6 are available. Based on the metadata record 28-3, the QIZ controller 44 determines that the quantum process 64 is not related to the quantum process 60 because the parent identifier 38 and the child identifier 40 are NULL, indicating that the quantum process 60 has no parent process or child process at this time. Because the quantum process 60 and the quantum process 64 are unrelated, the quantum process 64 has no visibility to or access to qubits 18 allocated to the quantum process 60, and the quantum process 60 has no visibility to or access to qubits 18 allocated to the quantum process 64.

Because the qubit 18-3 has been allocated to the quantum process 64, and the three qubits 18-4-18-6 are available, the QIZ controller 44 returns the qubit IDs of the qubits 18-1, 18-2, 18-4-18-6 to the quantum process 60 via the OS qubit interface 56, indicating that the quantum process 60 has access to the qubits 18-1 and 18-2, and that the qubits 18-4-18-6 are available for allocation. The quantum process 60 is thus unaware of the qubit 18-3 or the qubits 18-7-18-12.

Figure 1E:
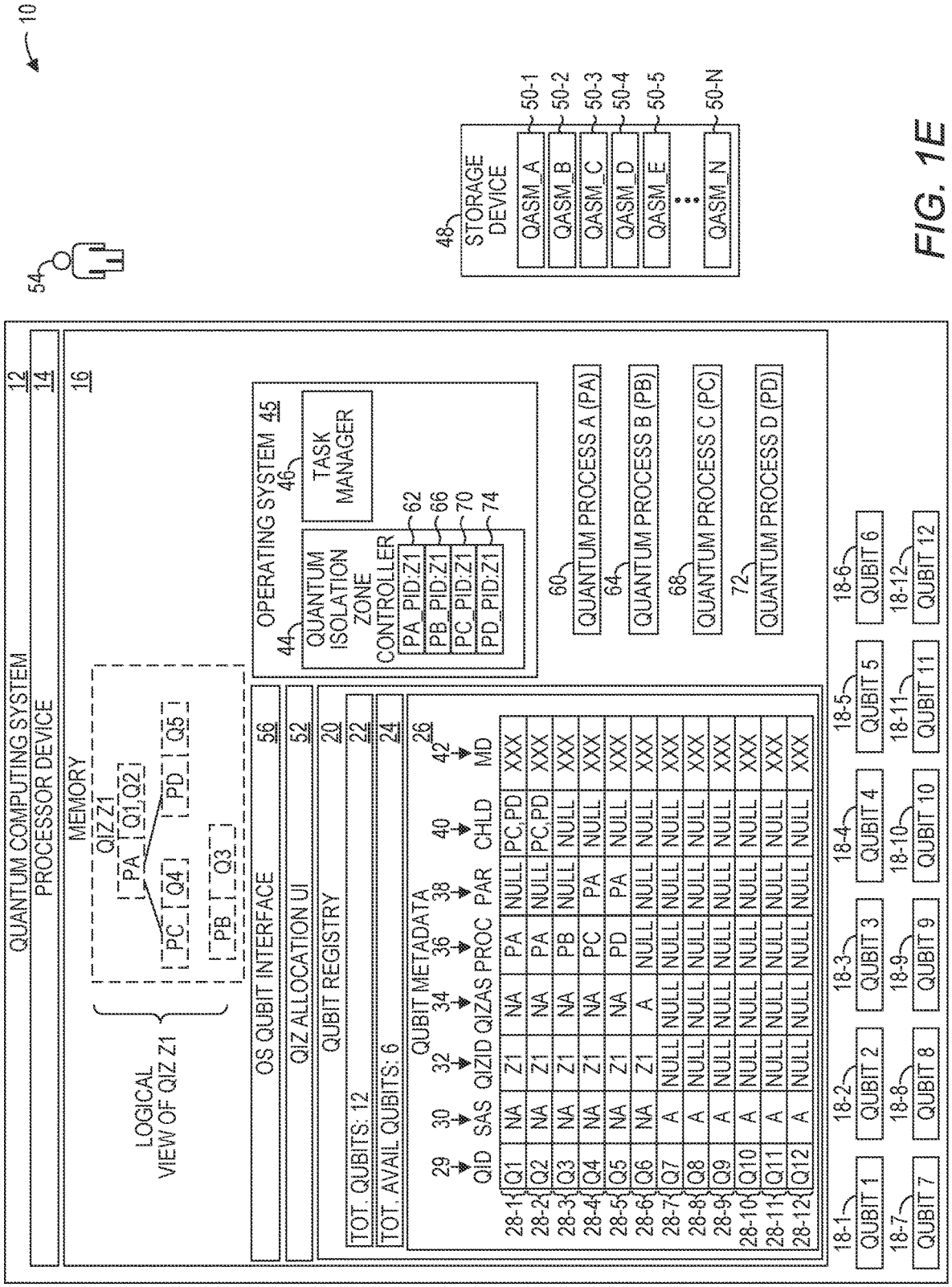

Referring now to FIG. 1E, a QIZ relationship graph that establishes relationships among quantum processes in a QIZ will be discussed. Assume that, in a manner similar to that discussed above with regard to the quantum processes 60 and 64, a quantum process 68 ("PC") is initiated from the QASM file 50-3 into the QIZ Z1 and allocated the qubit 18-4. The QIZ controller 44 generates a mapping record 70 that maps the PID of the quantum process 68 ("PC_PID") to the QIZ Z1. However, in this example, the quantum process 68 is identified as a child process of the quantum process 60. The designation may occur in any of several different manners. In one implementation, the task manager 46 may communicate to the QIZ controller 44 that the quantum process 68 is to be designated a child process of the quantum process 60. In another example, the request to initiate the quantum process 68 from the QASM file 50-3, and to allocate a qubit 18 to the quantum process 68, may originate from the quantum process 60. In this example, the act of the quantum process 60 requesting the initiation of the quantum process 68 by itself identifies the parent-child relationship.

The QIZ controller 44 modifies the QIZ availability status 34 of the metadata record 28-4 to indicate that the qubit 18-4 is no longer available for allocation. The QIZ controller 44 modifies the process identifier 36 of the metadata record 28-4 to indicate that the qubit 18-4 is allocated to the quantum process 68. The QIZ controller 44 modifies the parent identifier 38 of the metadata record 28-4 to indicate that the quantum process 60 is a parent process of the quantum process 68. The QIZ controller 44 modifies the child identifier 40 of the metadata records 28-1 and 28-2 to indicate that the quantum process 68 is a child process of the quantum process 60.

Assume further that a quantum process 72 ("PD") is initiated from the QASM file 50-4 into the QIZ Z1 and allocated the qubit 18-5. The QIZ controller 44 generates a mapping record 74 that maps the PID of the quantum process 72, PD_PID, to the QIZ Z1. In this example, the quantum process 72 is also identified as a child process of the quantum process 60.

The QIZ controller 44 modifies the QIZ availability status 34 of the metadata record 28-5 to indicate that the qubit 18-5 is no longer available for allocation. The QIZ controller 44 modifies the process identifier 36 of the metadata record 28-5 to indicate that the qubit 18-5 is allocated to the quantum process 72. The QIZ controller 44 modifies the parent identifier 38 of the metadata record 28-5 to indicate that the quantum process 60 is a parent process of the quantum process 72. The QIZ controller 44 modifies the child identifier 40 of the metadata records 28-1 and 28-2 to indicate that the quantum process 72 is a child process of the quantum process 60.

The metadata records 28-1, 28-2, 28-4 and 28-5 establish a relationship graph that appears, logically, as that illustrated in the logical view of the QIZ Z1 in FIG. 1E, such that the quantum process 60 is the parent process of the child quantum processes 68 and 72. As will be discussed herein, the relationship graph established in the metadata records 28-1, 28-2, 28-4, and 28-5 impacts the visibility of qubits 18 by the quantum processes 60, 64, 68, and 72.

To illustrate the impact of the relationship graph in the QIZ Z1, assume that the quantum process 60 issues a request to the OS qubit interface 56 to obtain a list of qubit IDs of all qubits 18 to which the quantum process 60 has access (i.e., read access and/or write access) or which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, and that the qubit 18-6 is available. The QIZ controller 44 also determines that the qubits 18-1 and 18-2 have been allocated to the quantum process 60. The QIZ controller 44 determines that the quantum process 60 has two child processes executing in the QIZ Z1, the quantum processes 68 and 72. Because the quantum processes 68 and 72 are child processes of the quantum process 60, the quantum process 60 has access to the qubits 18-4 and 18-5 allocated to the quantum processes 68 and 72, respectively. The QIZ controller 44 returns the qubit IDs of the qubits 18-1, 18-2, and 18-4-18-6, indicating that the quantum process 60 has access to the qubits 18-1, 18-2, 18-4, and 18-5, and that the qubit 18-6 is available for allocation.

Assume next that the quantum process 68 issues a request to the OS qubit interface 56 to obtain a list of qubit IDs of all qubits 18 to which the quantum process 68 has access (i.e., read access and/or write access) or which are available for allocation. The OS qubit interface 56 communicates with the QIZ controller 44. The QIZ controller 44 determines the PID of the requestor, in this case the PID PC_PID, which is the PID of the quantum process 68. The QIZ controller 44 accesses the mapping record 70 and determines that the quantum process 68 is associated with the QIZ Z1. The QIZ controller 44 accesses the metadata records 28 and determines that the qubits 18-1-18-6 have been allocated to the QIZ Z1, and that the qubit 18-6 is available. The QIZ controller 44 also determines that the qubit 18-4 has been allocated to the quantum process 68. The QIZ controller 44 determines that the quantum process 68 has no child processes executing in the QIZ Z1, and that the quantum process 60 is a parent process of the quantum process 68. Because the quantum process 60 is a parent process of the quantum process 68, the quantum process 68 has access to the qubits 18-1 and 18-2 allocated to the quantum process 60. However, because the quantum process 72 is neither a parent process nor a child process of the quantum process 68, the quantum process 68 has no visibility to the qubit 18-5 allocated to the quantum process 72. The QIZ controller 44 returns the qubit IDs of the qubits 18-1, 18-2, 18-4 and 18-6, indicating that the quantum process 68 has access to the qubits 18-1, 18-2, and 18-4, and that the qubit 18-6 is available for allocation.

Figure 1F:
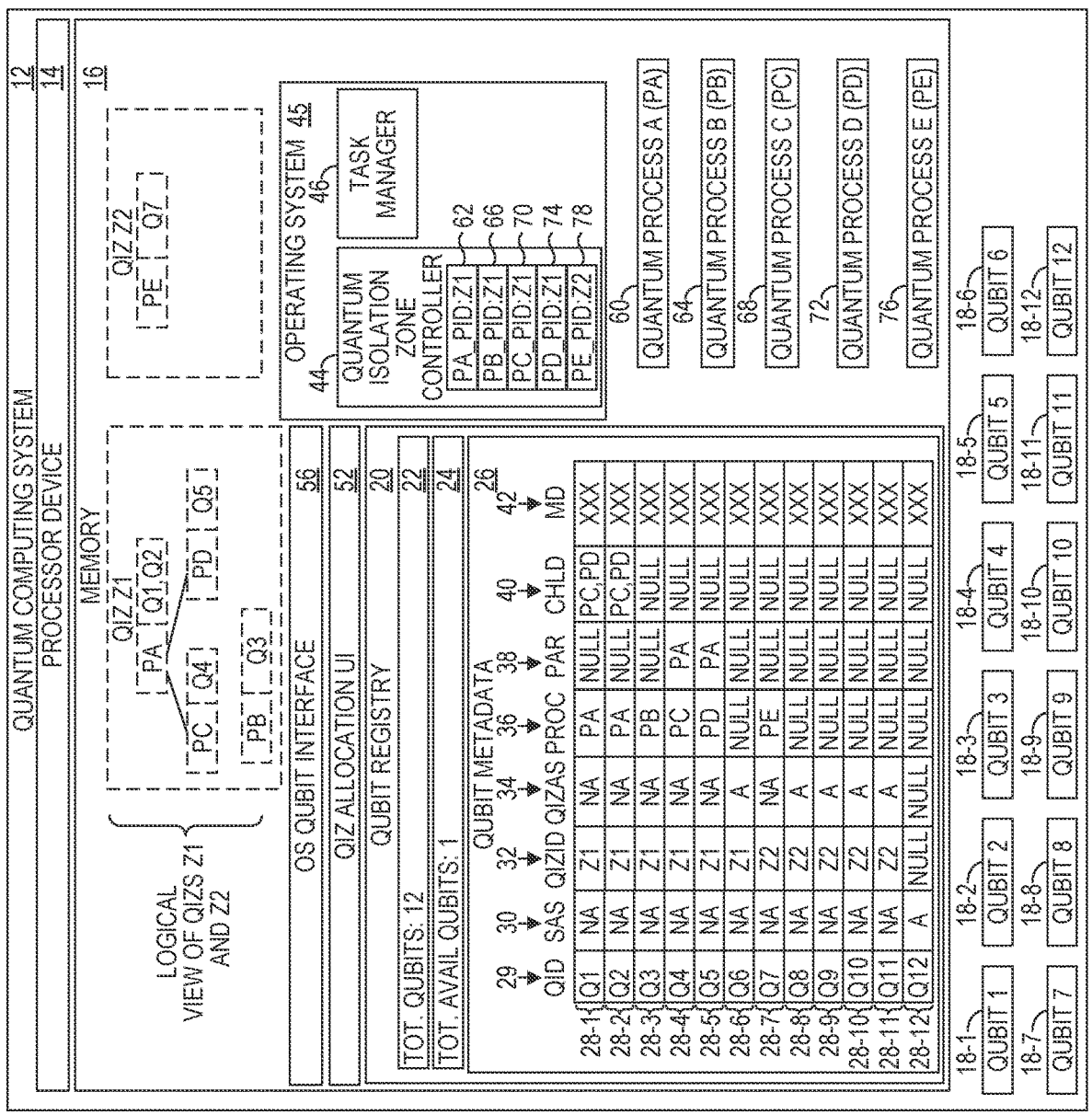

The QIZ controller 44 receives a request, from a requestor, to allocate a second group of qubits 18 from available qubits 18 to establish a second QIZ that limits visibility of any quantum process associated with the second QIZ to only the qubits 18 in the second group of qubits 18. In this example, the request indicates that five qubits 18 are to be allocated to the second QIZ. The QIZ controller 44 accesses the qubit metadata 26 and identifies five qubits 18 that have a system availability status 30 that indicates the qubits 18 are available. In this example, the QIZ controller 44 determines that the five qubits 18-7-18-11 are available based on the system availability status 30 of the metadata records 28-7-28-11. Referring now to FIG. 1F, the QIZ controller 44 modifies the system availability status 30 of the metadata records 28-7-28-11 to indicate that the five qubits 18-7-18-11 are no longer available for allocation. The QIZ controller 44 obtains a unique QIZ identifier, in this example, "Z2", and modifies the QIZ ID 32 of the metadata records 28-7-28-11 to indicate that the qubits 18-7-18-11 have been allocated to the QIZ Z2. The QIZ controller 44 modifies the QIZ availability status 34 of the metadata records 28-7-28-11 to indicate that the qubits 18-7-18-11 are available for allocation within the QIZ Z2. The QIZ controller 44 modifies the total available qubits counter 24 to indicate that one qubit 18 (i.e., qubit 18-12) is now available for allocation to a QIZ.

Assume further that the task manager 46 receives a request to initiate a quantum process based on the QASM file 50-5 into the QIZ Z2. The task manager 46 may access the QASM file 50-5 and parse the QASM file 50-5 to determine that, during execution, the quantum process initiated from the QASM file 50-5 will utilize one qubit 18. The task manager 46 sends a request to the QIZ controller 44 for an allocation of one qubit 18 from the QIZ Z2. The QIZ controller 44 receives the request to allocate one qubit in the QIZ Z2 to a quantum process that is, or will be, associated with the QIZ Z2. Based on the metadata records 28, the QIZ controller 44 determines that the qubit 18-7 is available for allocation within the QIZ Z2 and modifies the QIZ availability status 34 of the metadata record 28-7 to indicate that the corresponding qubit 18-7 has been allocated and thus is no longer available for allocation (e.g., "NA").

The QIZ controller 44 provides the qubit ID of the qubit 18-7 to the task manager 46. The task manager 46 initiates a quantum process 76 ("PE") into the QIZ Z2 with location information of the qubit 18-7. The task manager 46 provides a unique program ID (PID) ("PE_PID") of the quantum process 76 to the QIZ controller 44. The QIZ controller 44 generates a mapping record 78 that maps the PID to the QIZ Z2. The quantum process 60 is now said to "execute in" or be "associated with" the QIZ Z2.

Assume that, at the point in time illustrated in FIG. 1F, the quantum process 76 issues a request to the OS qubit interface 56 to obtain a list of qubit
IDs of all qubits 18 to which the quantum process 76 has access (i.e., read access and/or write access) or which are available for allocation. The OS qubit interface 56 communicates with the QIZ controller 44. The QIZ controller 44 determines the PID of the requestor, in this case the PID PE_PID, which is the PID of the quantum process 76. The QIZ controller 44 accesses the mapping record 78 and determines that the quantum process 76 is associated with the QIZ Z2. The QIZ controller 44 accesses the metadata records 28 and determines that the qubits 18-7-18-11 have been allocated to the QIZ Z2, and that the qubits 18-8-18-11 are available. Because the qubit 18-7 has already been allocated to the quantum process 76 and the four qubits 18-8-18-11 are available, the QIZ controller 44 returns the qubit IDs of the qubits 18-7-18-11 to the quantum process 76 via the OS qubit interface 56, indicating that the quantum process 76 has access to the qubit 18-7, and that the qubits 18-8-18-11 are available for allocation. Thus, from the perspective of the quantum process 76, the quantum computing system 12 contains four available qubits 18, and the quantum process 76 is unaware of and unable to access (e.g., is isolated from) the qubits 18-1-18-6 and 18-12.

It is noted that because the QIZ controller 44 is a component of the quantum computing system 12, functionality implemented by the QIZ controller 44 may be attributed to the quantum computing system 12 generally. Moreover, in examples where the QIZ controller 44 comprises software instructions that program the processor device 14 to carry out functionality discussed herein, functionality implemented by the QIZ controller 44 may be attributed herein to the processor device 14.

Figure 2:
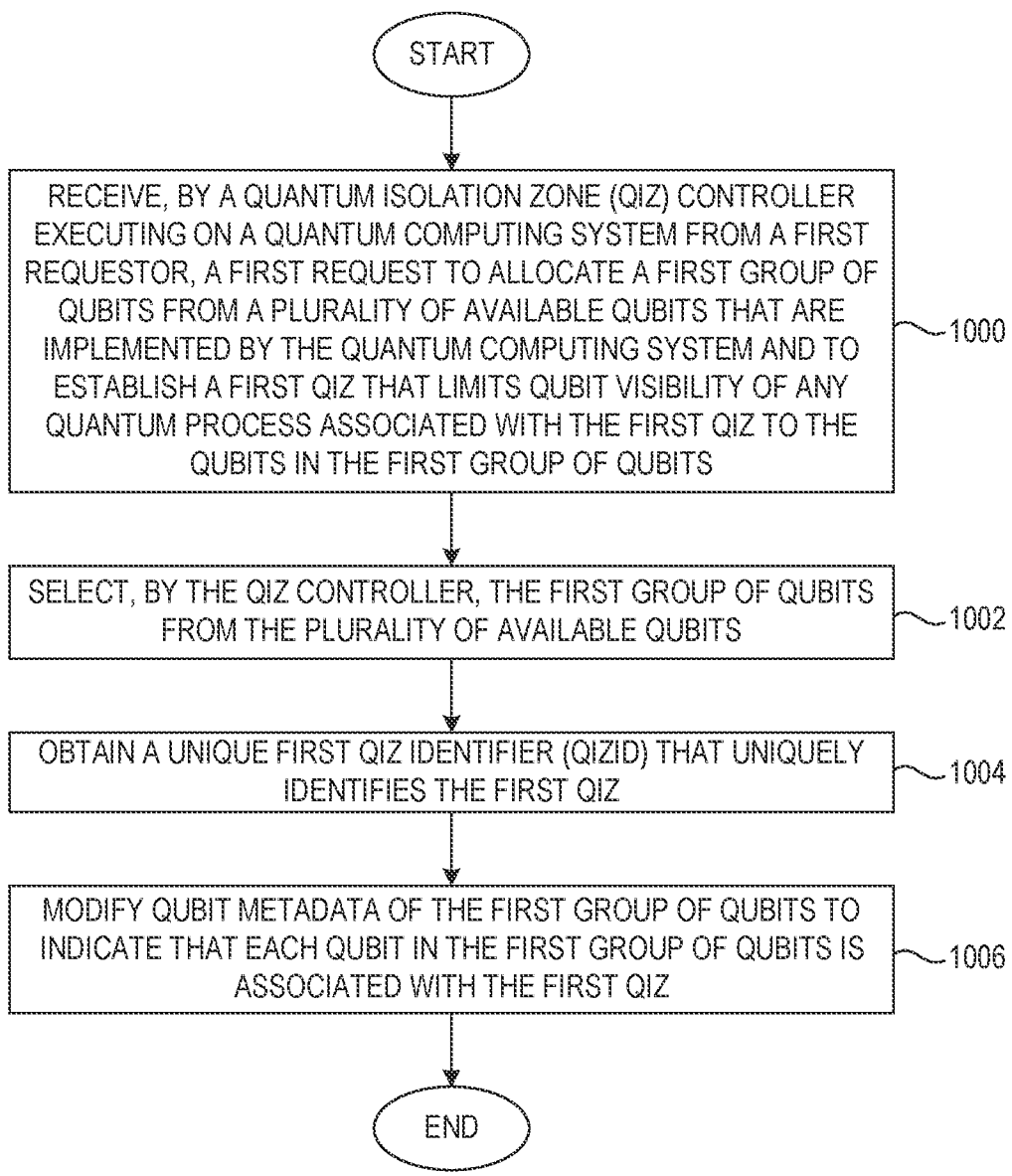
FIG. 2 is a flowchart of a method for implementing QIZs according to one implementation.

FIG. 2 is a flowchart of a method for implementing QIZs according to one implementation. FIG. 2 will be discussed in conjunction with FIGS. 1A-1F. The QIZ controller 44 receives, from a requestor, a request to allocate a group of the qubits 18 from the plurality of available qubits 18 that are implemented by the quantum computing system 12 and establish the QIZ Z1 that limits qubit visibility of any quantum process associated with the QIZ Z1 to only the qubits 18 in the group of qubits 18 (FIG. 2, block 1000). The QIZ controller 44 selects the first group of qubits 18-1-18-6 from the plurality of available qubits 18-1-18-12 (FIG. 2, block 1002). The QIZ controller 44 obtains the QIZ identifier (QIZID) Z1 that uniquely identifies the QIZ Z1 (FIG. 2, block 1004). The QIZ controller 44 modifies the qubit metadata records 28-1-28-6 of the group of qubits 18-1-18-6 to indicate that each qubit 18 in the group of qubits 18-1-18-6 is associated with the QIZ Z1 (FIG. 2, block 1006).

Figure 3:
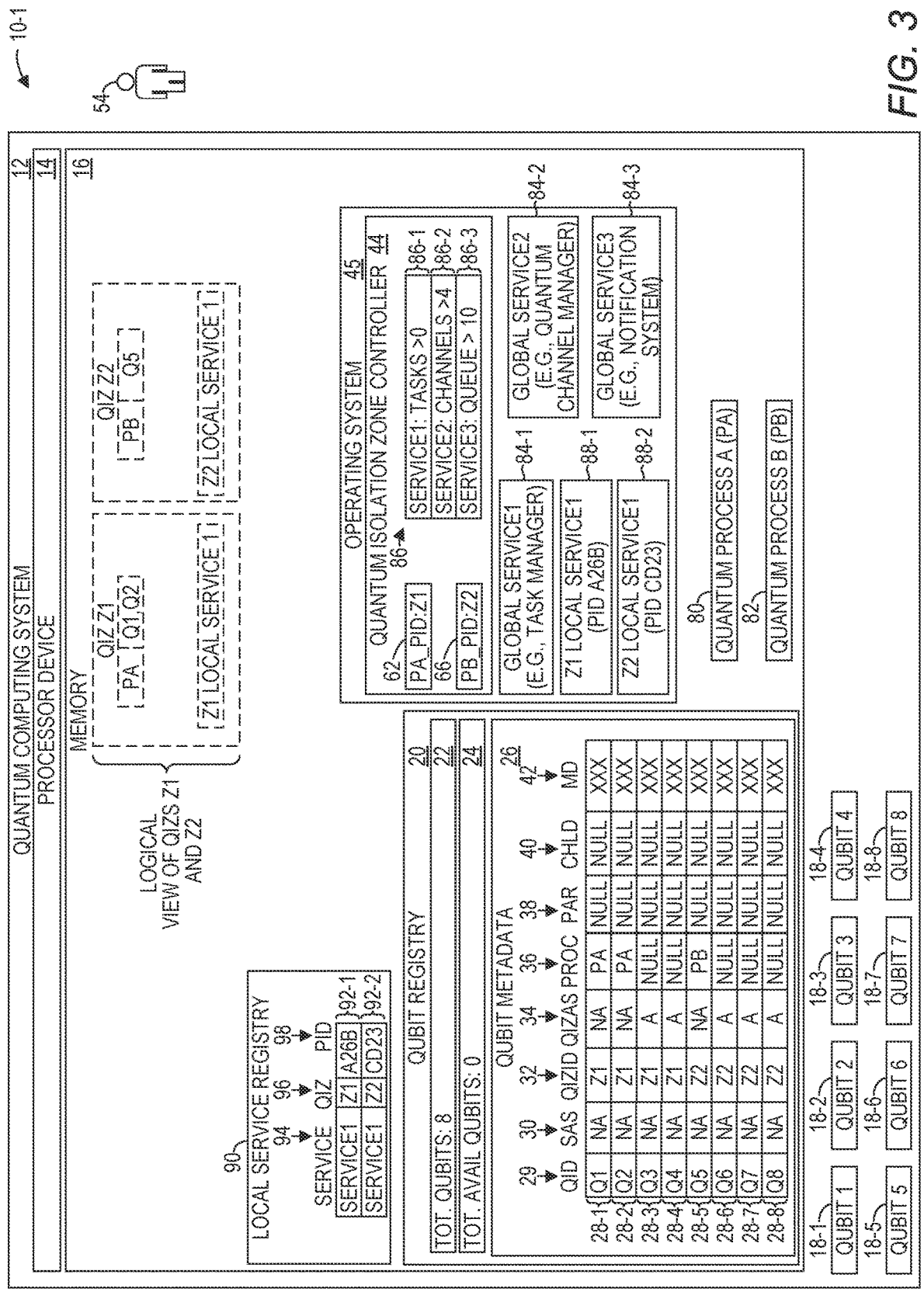
FIG. 3 is a block diagram of an environment for implementing local services in a QIZ according to one implementation.

FIG. 3 is a block diagram of an environment 10-1 for implementing local services in a QIZ according to one implementation. The environment 10-1 is substantially similar to the environment 10 except as otherwise noted herein. In this example, solely due to space constraints of FIG. 3, the quantum computing system 12 implements eight qubits 18-1-18-8. The QIZ controller 44 has established the QIZ Z1 and the QIZ Z2. The QIZ Z1 has been allocated the four qubits 18-1-18-4 and the QIZ Z2 has been allocated the four qubits 18-5-18-8. A quantum process 80 is associated with, or "executes in" the QIZ Z1 and has been allocated the qubits 18-1 and 18-2. A quantum process 82 is associated with, or "executes in" the QIZ Z2 and has been allocated the qubit 18-5.

The operating system 45 includes a plurality of global service instances 84-1-84-3. The term "instance" in this context refers to a running process. The global service instances 84-1-84-3 (generally global service instances 84) implement various services for processes that execute on the quantum computing system 12. The term "global service" refers to functionality that is offered to processes executing on the quantum computing system 12. As an example, the global service instance 84-1 may comprise a task manager that provides task management services for processes executing on the quantum computing system 12. The services provided by a global service instance 84 may be requested directly by a process executing on the quantum computing system 12, such as via an application programming interface, or indirectly in response to some requested operating system function, such as a read or write operation. The global service instances 84 may be kernel processes that run in kernel space, and/or execute at ring 0 level of the processor device 14.

The QIZ controller 44 makes a determination that a local service instance of the global service instance 84-1 should be initiated. The determination may be made in any number of ways. In one example, the QIZ controller 44 may make the determination in response to receiving a request to initiate the local service instance. For example, the operator 54 may submit a request via the QIZ allocation UI 52 to initiate, for a particular QIZ, a local service instance of the global service instance 84-1. In another example, the QIZ controller 44 may access a threshold criterion, or criteria, 86, which identify criteria via which the QIZ controller 44 should make the determination to initiate a local service instance. In this example, a criterion 86-1 indicates that a local service instance of the global service instance 84-1 should be initiated when a QIZ has at least one quantum process associated therewith. A criterion 86-2 indicates that a local service instance of the global service instance 84-2 should be initiated when quantum processes associated with a QIZ are utilizing more than four quantum channels. A criterion 86-3 indicates that a local service instance of the global service instance 84-3 should be initiated when a message queue depth of a quantum process executing in a QIZ has a queue depth greater than ten messages. When the QIZ controller 44 determines that a threshold criterion 86 has been exceeded, the QIZ controller 44 makes the determination to initiate a local service instance of the global service instance that corresponds to the particular threshold criterion 86.

In this example, the QIZ controller 44 has made the determination to initiate a local service instance of the global service instance 84-1 for the QIZ Z1. The QIZ controller 44 causes a local service instance 88-1 to be initiated. In one implementation, the QIZ controller 44 may cause the local service instance 88-1 to be initiated using, for example, a fork command to cause the local service instance 88-1 to be initiated as a child process of the QIZ controller 44. The local service instance 88-1 may run at a ring 0 level of the processor device 14 and thus execute in a kernel mode and a kernel space rather than as a user process in a user space.

The QIZ controller 44 modifies a local service data structure, in this example a local service registry 90, to indicate that the local service instance 88-1 is associated with the QIZ Z1. In particular, the QIZ controller 44 generates an entry 92-1 that includes a service identifier 94 that identifies the global service (e.g., "SERVICE1") that is implemented by the local service instance 88-1, a QIZ identifier 96 ("Z1") that identifies the QIZ with which the local service instance 88-1 is associated, and a program identifier (PID) 98 ("A26B") of the local service instance 88-1. In some examples, the QIZ controller 44 may immediately put the local service instance 88-1 into a "wait" or "suspended" state such that the local service instance 88-1 cannot service a request until awakened by the QIZ controller 44.

The QIZ controller 44 has also made the determination to initiate a local service instance of the global service instance 84-1 for the QIZ Z2. The QIZ controller 44 causes a local service instance 88-2 to be initiated. Again, the QIZ controller 44 may cause the local service instance 88-2 to be initiated using, for example, a fork command to cause the local service instance 88-2 to also be initiated as a child process of the QIZ controller 44. The local service instance 88-2 may run at a ring 0 level of the processor device 14 and thus execute in a kernel mode and a kernel space rather than as a user process in a user space.

The QIZ controller 44 modifies the local service registry 90 to indicate that the local service instance 88-2 is associated with the QIZ Z2. In particular, the QIZ controller 44 generates an entry 92-2 that includes a service identifier 94 that identifies the global service (e.g., "SERVICE1") that is implemented by the local service instance 88-2, a QIZ identifier 96 ("Z2") that identifies the QIZ with which the local service instance 88-2 is associated, and a program identifier (PID) 98 ("CD23") of the local service instance 88-2.

Subsequently, the QIZ controller 44 determines that the quantum process 80 has issued a service request for a service provided by the global service instance 84-1. In some examples, the operating system 45 may be designed to route service requests for any global service made by any executing process to the QIZ controller 44 rather than directly to the global service instance that would normally service the request. For example, reads, writes, or any other attempt to access hardware or memory may be transparently routed by the operating system 45 to the QIZ controller 44. Any application programming interface (API) call made by an executing process may similarly be examined by the operating system 45, and if the API call is associated with a global service, first routed to the QIZ controller 44.

The QIZ controller 44 may determine, in conjunction with determining that the service request has been issued, that the request has originated from the particular quantum process 80, and/or the QIZ Z1. For example, in conjunction with routing a service request to the QIZ controller 44, the operating system 45 may include information that identifies the originator of the request, in this example the quantum process 80, and the QIZ with which the originator is associated, in this example, the QIZ Z1.

The QIZ controller 44 accesses the local service registry 90 and, based on the entry 92-1, determines that the local service instance 88-1 is associated with the QIZ Z1 and is a local service instance of the global service instance 84-1. If the QIZ controller 44 caused the local service instance 88-1 to go into a "wait" or "suspended" state, the QIZ controller 44 awakens the local service instance 88-1 so that the local service instance 88-1 can service the service request. The QIZ controller 44 then provides the service request to the local service instance 88-1 in lieu of providing the service request to the global service instance 84-1. The local service instance 88-1 receives the service request and provides the requested service for the quantum process 80. Subsequent to servicing the service request, the QIZ controller 44 may again place the local service instance 88-1 into a "wait" or "suspended" state.

The QIZ controller 44 then determines that the quantum process 82 has issued a service request for a service provided by the global service instance 84-1. The QIZ controller 44 accesses the local service registry 90 and, based on the entry 92-2, determines that the local service instance 88-2 is associated with the QIZ Z2 and is a local service instance of the global service instance 84-1. The QIZ controller 44 then provides the service request to the local service instance 88-2 in lieu of providing the service request to the global service instance 84-1. The local service instance 88-2 receives the service request and provides the requested service for the quantum process 82.

Figure 4:
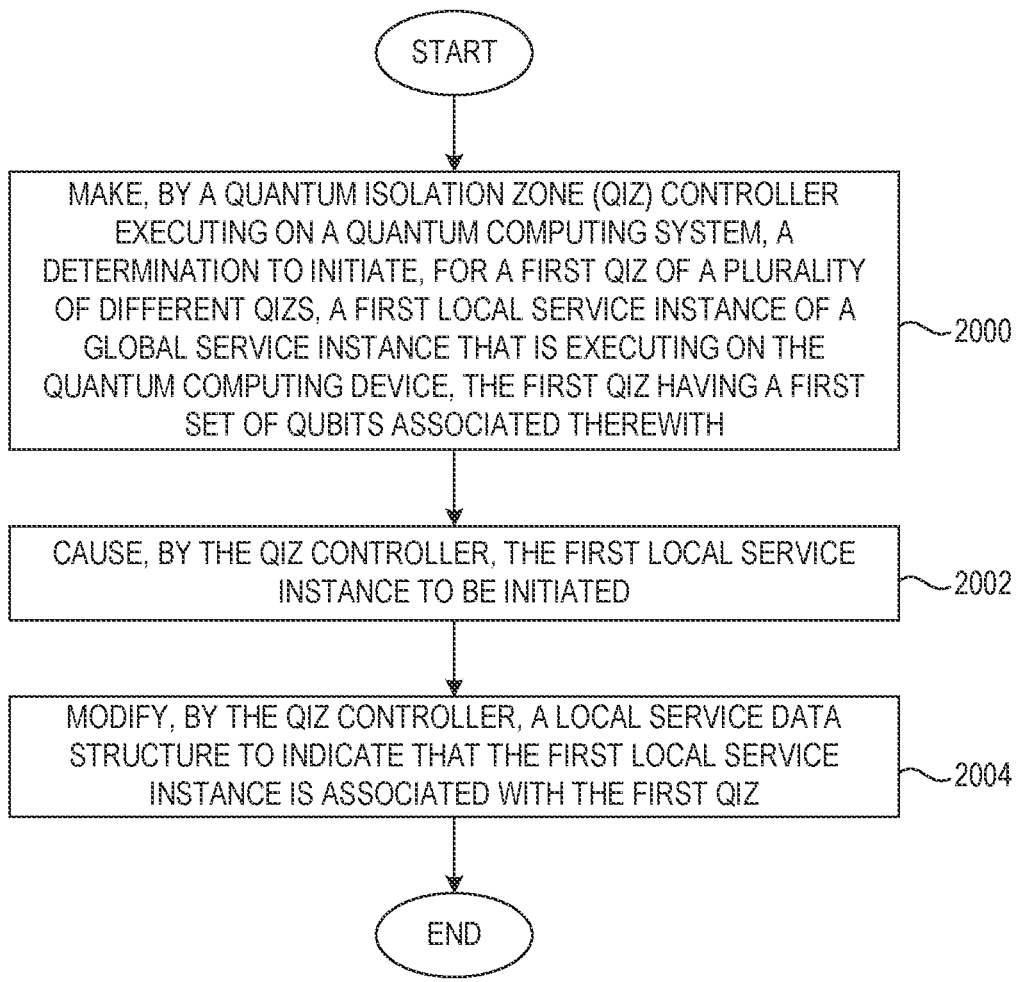
FIG. 4 is a flowchart of a method for implementing a local service instance in a QIZ according to one implementation.

FIG. 4 is a flowchart of a method for implementing a local service instance in a QIZ according to one implementation. FIG. 4 will be discussed in conjunction with FIG. 3. The QIZ controller 44 makes a determination to initiate, for the QIZ Z1 of the plurality of different QIZs, a local service instance of the global service instance 84-1 that is executing on the quantum computing system 12, the QIZ Z1 having the set of qubits 18-1-18-4 associated therewith (FIG. 4, block 2000). The QIZ controller 44 causes the local service instance 88-1 to be initiated (FIG. 4, block 2002). The QIZ controller modifies the local service data structure such as the local service registry 90 to indicate that the local service instance 88-1 is associated with the QIZ Z1 (FIG. 4, block 2004).

Figure 5:
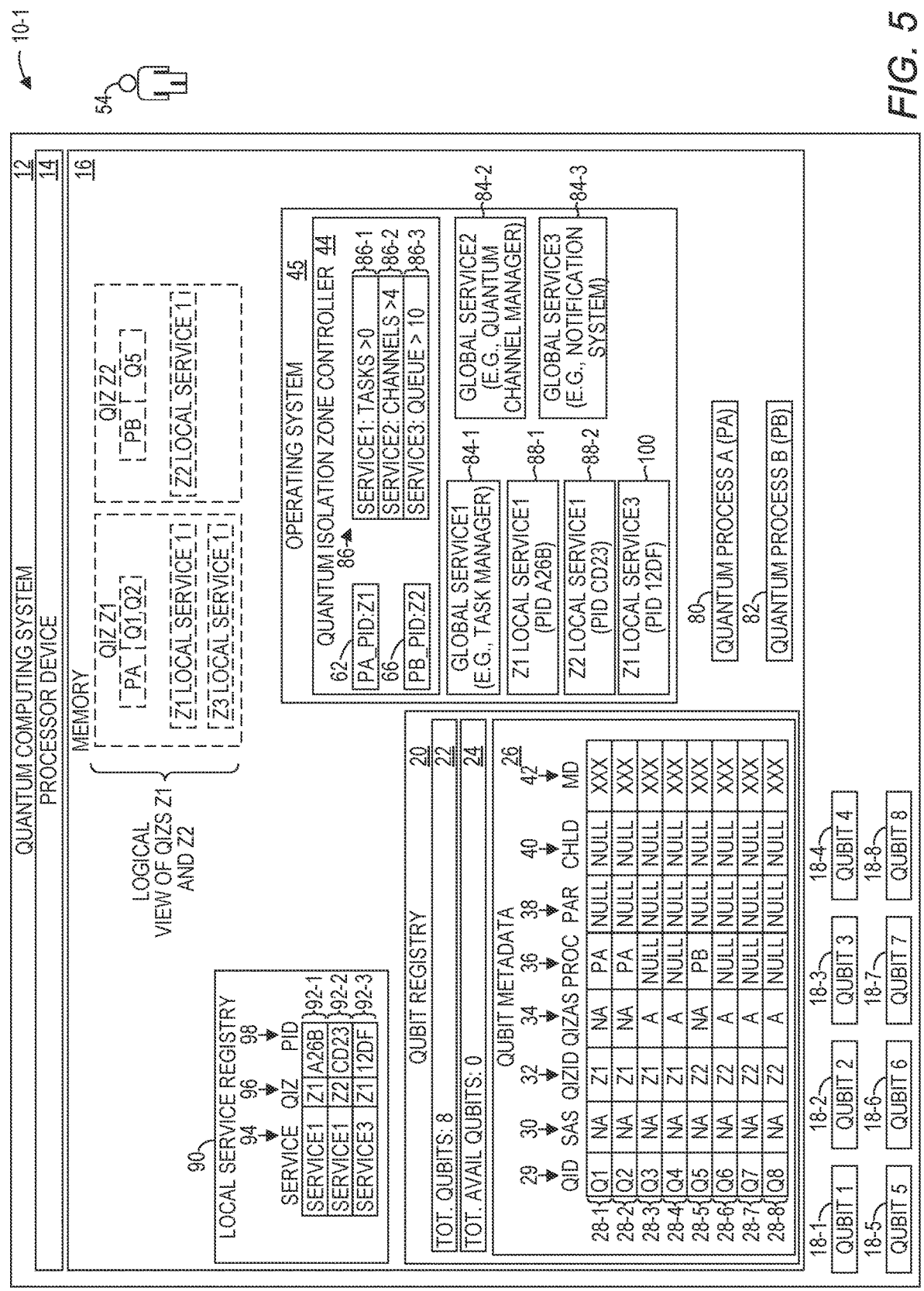
FIG. 5 is a block diagram of the environment illustrated in FIG. 3 at a subsequent point in time to that illustrated in FIG. 3 according to one implementation.

FIG. 5 is a block diagram of the environment 10-1 at a subsequent point in time to that illustrated in FIG. 3 according to one implementation. The QIZ controller 44 may periodically monitor the threshold criteria 86 to determine if a local service instance is to be initiated. In this example, the QIZ controller 44 determines that a queue depth of the quantum process 80 has exceeded a depth of 10. The QIZ controller 44 causes a local service instance 100 of the global service instance 84-3 to be initiated. In one implementation, the QIZ controller 44 may cause the local service instance 100 to be initiated using, for example, a fork command to cause the local service instance 100 to be initiated as a child process of the QIZ controller 44. The local service instance 100 may run at a ring 0 level of the processor device 14 and thus execute in a kernel mode and a kernel space rather than as a user process in a user space.

The QIZ controller 44 modifies the local service registry 90 to indicate that the local service instance 100 is associated with the QIZ Z1. In particular, the QIZ controller 44 generates an entry 92-3 that includes a service identifier 94 that identifies the global service (e.g., "SERVICE3") that is implemented by the local service instance 100, a QIZ identifier 96 ("Z1") that identifies the QIZ with which the local service instance 100 is associated, and a program identifier (PID) 98 ("12DF") of the local service instance 100.

Subsequently, the QIZ controller 44 determines that the quantum process 80 has issued a service request for a service provided by the global service instance 84-3. The QIZ controller 44 accesses the local service registry 90 and, based on the entry 92-3, determines that the local service instance 100 is associated with the QIZ Z1 and is a local service instance of the global service instance 84-3. The QIZ controller 44 then provides the service request to the local service instance 100 in lieu of providing the service request to the global service instance 84-3. The local service instance 100 receives the service request and provides the requested service for the quantum process 80.

The QIZ controller 44 then determines that the quantum process 82 has issued a service request for a service provided by the global service instance 84-3. The QIZ controller 44 accesses the local service registry 90 and determines that the QIZ Z2 lacks a local service instance of the global service instance 84-3. The QIZ controller 44 provides the service request to the global service instance 84-3.

Figure 6A:
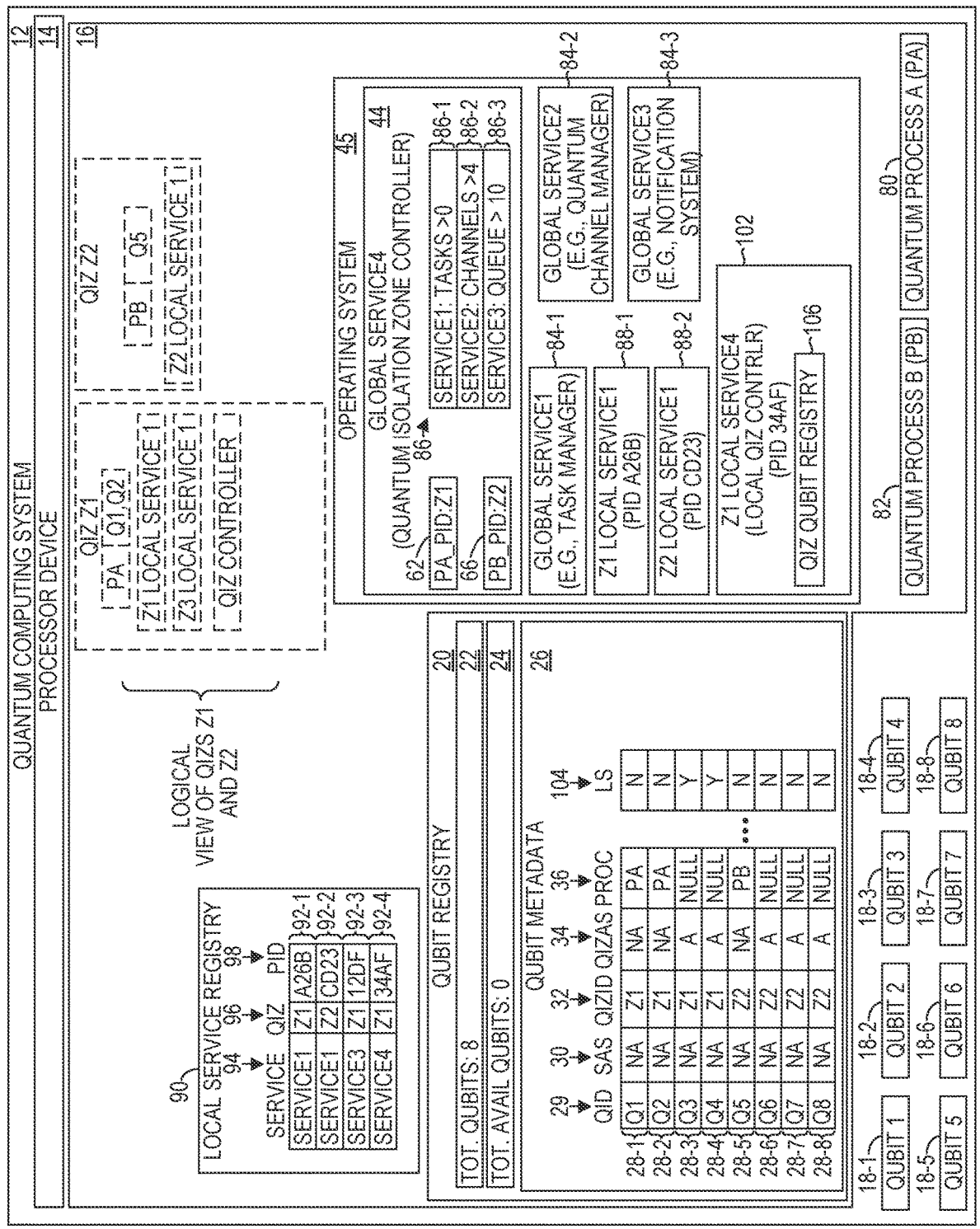

FIGS. 6A-6F illustrate the environment 10-1 according to another implementation. Referring first to FIG. 6A, the QIZ controller 44 is itself a global service having an identifier of SERVICE4. The QIZ controller 44 receives a request to initiate a local service instance of the QIZ controller service (i.e., SERVICE4) for the QIZ Z1. The request also indicates that two qubits 18 are to be allocated to the local service instance. The request may be made, for example, from the operator 54. The QIZ controller 44 causes a local service instance 102 (hereinafter referred to as the "local QIZ controller 102" for purposes of simplicity) to be initiated. Again, the local QIZ controller 102 may run at a ring 0 level of the processor device 14 and thus execute in a kernel mode and a kernel space rather than as a user process in a user space. The QIZ controller 44 modifies the local service registry 90 to indicate that the local QIZ controller 102 is associated with the QIZ Z1. In particular, the QIZ controller 44 generates an entry 92-4 that includes a service identifier 94 that identifies the global service (e.g., "SERVICE4") that is implemented by the local QIZ controller 102, a QIZ identifier 96 ("Z1") that identifies the QIZ with which the local QIZ controller 102 is associated, and a program identifier (PID) 98 ("34AF") of the local QIZ controller 102.

Based on the metadata records 28-3 and 28-4, the QIZ controller 44 determines that the QIZ Z1 has two available qubits 18-3 and 18-4 that can be allocated to the local QIZ controller 102. If the QIZ Z1 did not have a sufficient number of qubits 18 to be allocated to the local QIZ controller 102, the QIZ controller 44 would determine if the quantum computing system 12 had available qubits 18 that could be allocated to the QIZ Z1. If so, the QIZ controller 44 would allocate sufficient qubits 18 to the QIZ Z1, and then allocate two of such qubits 18 to the local QIZ controller 102.

The QIZ controller 44 modifies a local service flag 104 of the metadata records 28-3 and 28-4 to indicate that the qubits 18-3 and 18-4 are now under control of the local QIZ controller 102. The QIZ controller 44 sends, to the local QIZ controller 102, the information identified in the metadata records 28-3 and 28-4. The local QIZ controller 102 receives the information and generates a qubit registry 106 and populates the qubit registry 106 based on the metadata records 28-3 and 28-4.

Figure 6B:
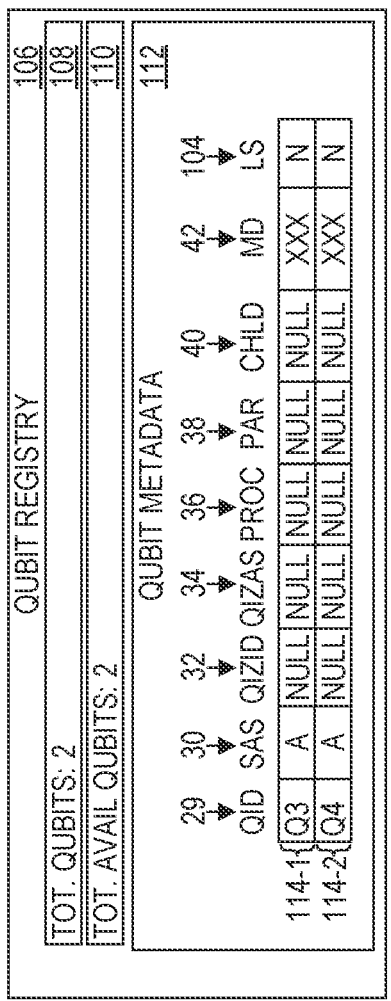

Referring now to FIG. 6B, a block diagram of the qubit registry 106 is illustrated. The qubit registry 106 includes a total qubits counter 108 that identifies the total number of qubits 18 controlled by the local QIZ controller 102, and a total available qubits counter 110 that maintains count of the total number of qubits 18 that are currently available for allocation by the local QIZ controller 102. The qubit registry 106 contains qubit metadata 112, which comprises a plurality of metadata records 114-1-114-2 (generally, metadata records 114), each of which maintains information about a corresponding qubit 18-3-18-4. Each metadata record 114 includes the qubit identifier (QID) 29 that contains an identifier of the qubit 18-3-18-4 to which the respective metadata record 114 corresponds, the system availability status (SAS) 30 that identifies whether the corresponding qubit 18 is available for allocation to a QIZ controlled by the local QIZ controller 102, the QIZ identifier (QIZID) 32 that identifies the QIZ, if any, to which the corresponding qubit 18 has been allocated, and the QIZ availability status (QIZAS) 34 that identifies whether the corresponding qubit 18, if allocated to a QIZ, is available in the QIZ or has been allocated to a quantum process executing in the QIZ. Each metadata record 114 also includes the process identifier 36 of the quantum process, if any, to which the corresponding qubit 18 has been allocated, the parent identifier 38 that identifies the parent quantum process, if any, of the quantum process to which the corresponding qubit 18 has been assigned, and the child identifier 40 that identifies the child quantum process, if any, of the quantum process to which the corresponding qubit 18 has been assigned. Each metadata record 114 may also include additional metadata 42 not relevant to the examples disclosed herein, such as metadata indicating the real-time state of the corresponding qubit 18, such as whether the qubit 18 is in an entangled state, is in superposition, the type of qubit 18, or the like.

Figure 6C:
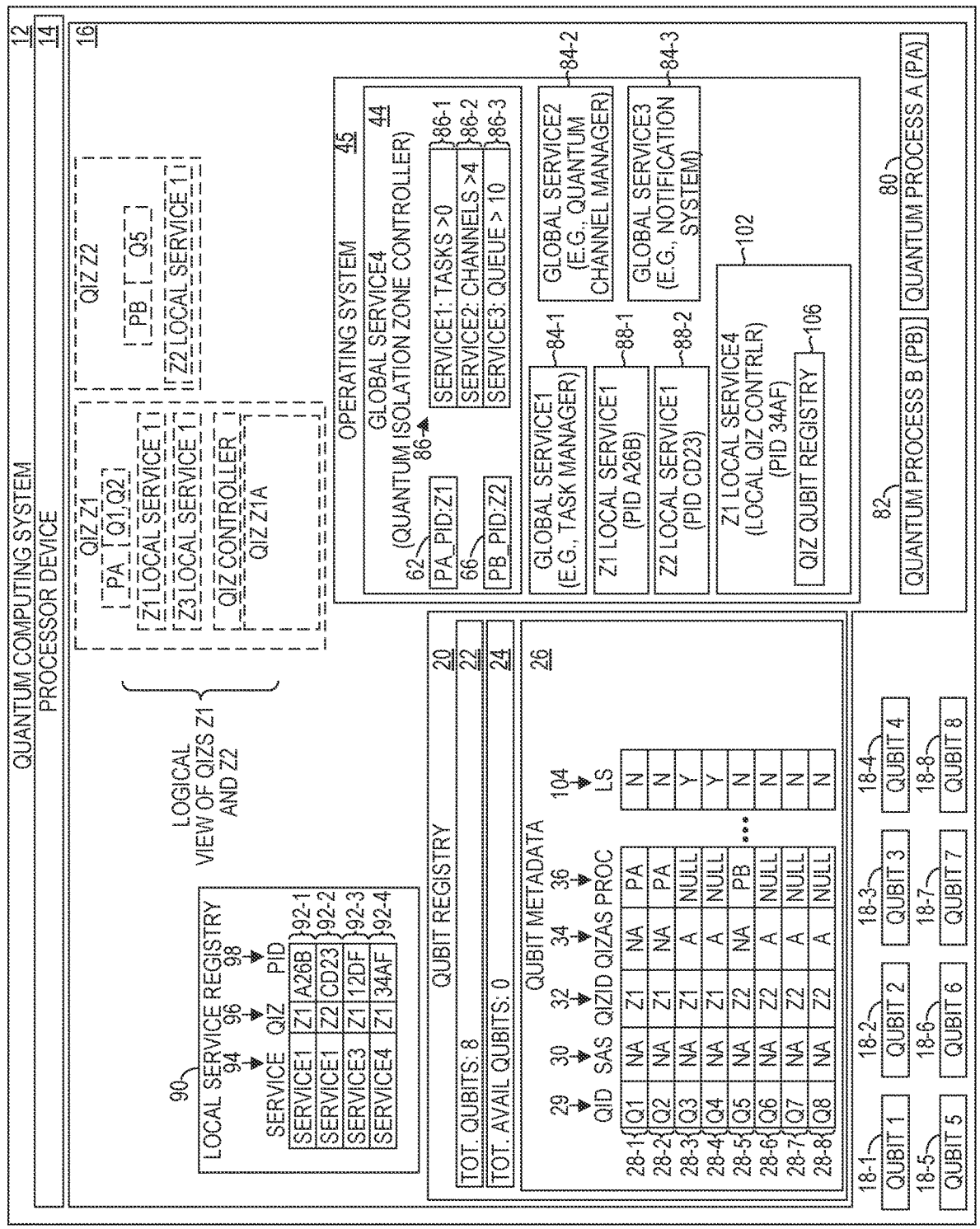

Referring now to FIG. 6C, assume that the local QIZ controller 102 receives a request from a requestor to allocate a first group of qubits 18 from available qubits 18 to establish a QIZ that limits visibility of any quantum process associated with the first QIZ to only the qubits 18 in the first group of qubits 18. The request may identify the number of qubits 18 and, if applicable, other criteria, such as a particular type of qubit, or any other desired characteristics of the qubits 18.

In one example, the requestor may be the QIZ allocation UI 52 which makes the request in response to input from the operator 54. In another example, the request may be a programmatic request from a process, such as the quantum process 80, executing on the quantum computing system 12 within the QIZ Z1. In this example, the request indicates that two qubits 18 are to be allocated to the QIZ. The local QIZ controller 102 accesses the qubit metadata 112 and identifies the two qubits 18-3 and 18-4 that have a system availability status 30 that indicates the qubits 18-3 and 18-4 are available for allocation to a QIZ.

The local QIZ controller 102 modifies the system availability status 30 of the metadata records 114-1 and 114-2 with a value of "NA" (not available) to indicate that the two qubits 18-3-18-4 are no longer available for allocation. The local QIZ controller 102 obtains a unique QIZ identifier, in this example, "Z1A", and modifies the QIZ ID 32 to indicate that the two qubits 18-3-18-4 have been allocated to the QIZ Z1A. The local QIZ controller 102 may generate the unique QIZ ID or be provided the unique QIZ ID by the requestor or some other mechanism. The local QIZ controller 102 modifies the QIZ availability status 34 to indicate that the two qubits 18-13-18-4 are available for allocation within the QIZ Z1A. The local QIZ controller 102 modifies the total available qubits counter 110 to indicate that no qubits 18 are now available for allocation to a QIZ.

For purposes of illustration, a logical QIZ Z1A is illustrated in dashed lines in FIG. 6C to facilitate an understanding of the isolation and relationship aspects of QIZs implemented by the examples herein. However, it should be understood that the QIZ Z1A illustrated in the Figures in dashed outline is a logical depiction only provided for ease of understanding and that the functionality of the QIZ Z1A is implemented via the local QIZ controller 102, the qubit metadata 112, and other components as described herein.

Referring now to FIG. 6D, a block diagram of the qubit registry 106 is illustrated showing a state of the qubit registry 106 after the generation of the QIZ Z1A and prior to the initiation of a quantum process in the QIZ Z1A and allocation of qubits 18 to such quantum process.

Figure 6E:
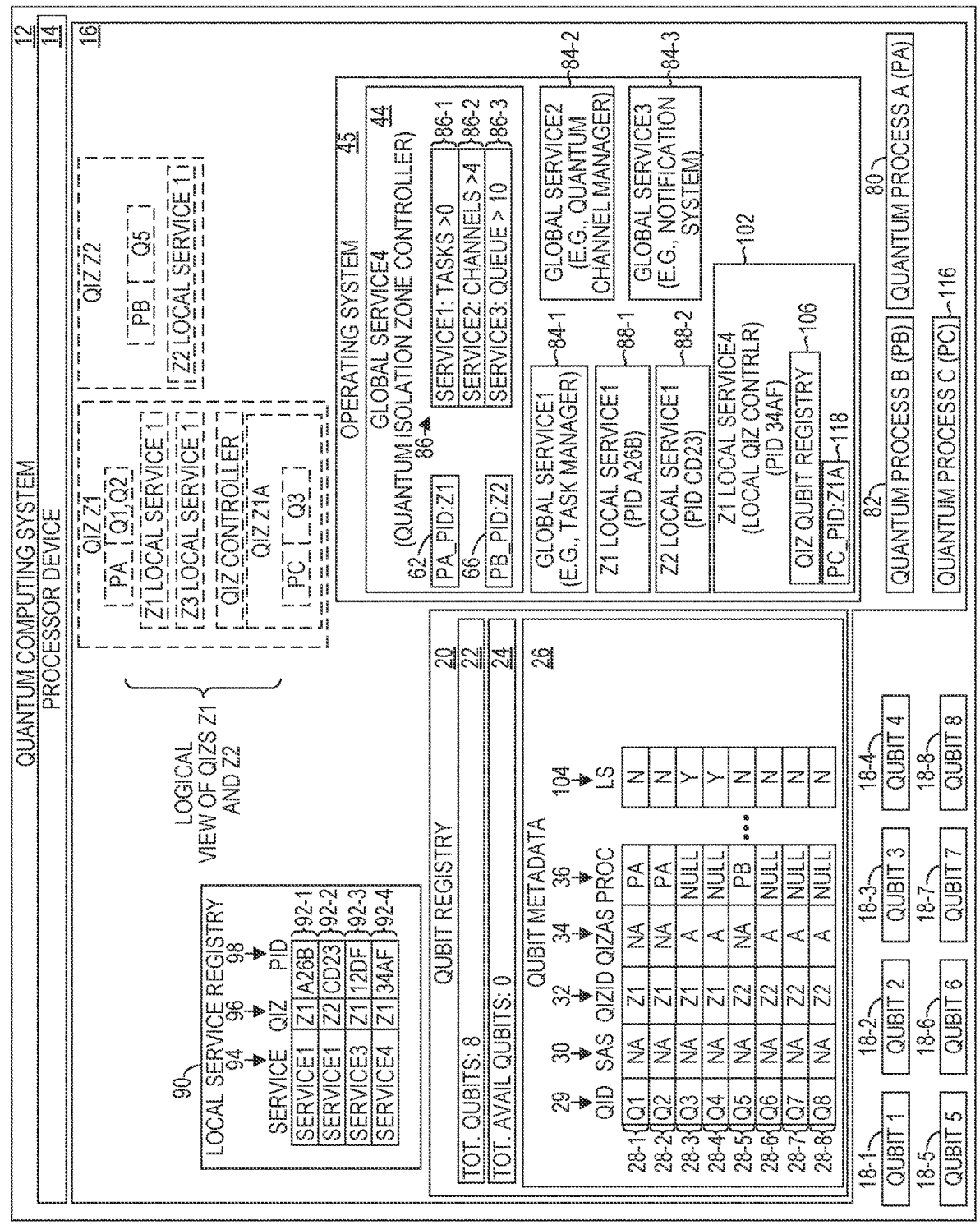

Referring now to FIG. 6E, assume that a service request is directed to the global service instance 84-1 (i.e., the "task manager" in this example) to initiate a quantum process into the QIZ Z1A. The request may be contained in a schedule, may be generated programmatically, or may be initiated via input from the operator 54. The QIZ controller 44, as discussed above with regard to FIG. 3, determines that the service request has been made and is associated with the QIZ Z1. The QIZ controller 44 accesses the local service registry 90 and, based on the entry 92-1, determines that the local service instance 88-1 is associated with the QIZ Z1 and is a local service instance of the global service instance 84-1. The QIZ controller 44 then provides the service request to the local service instance 88-1 in lieu of providing the service request to the global service instance 84-1.

The local service instance 88-1 receives the service request and accesses the QASM file that corresponds to the quantum process to be executed. The local service instance 88-1 determines that the quantum process to be executed will utilize one qubit 18. The local service instance 88-1 sends a service request to the QIZ controller 44 for an allocation of one qubit 18 from the QIZ Z1A. The QIZ controller 44 determines that the service request has been made and is associated with the QIZ Z1. The QIZ controller 44 accesses the local service registry 90 and, based on the entry 92-4, determines that the local service instance 102 is associated with the QIZ Z1 and is a local service instance of the global service instance 44 (i.e., the QIZ controller 44). The QIZ controller 44 then provides the service request to the local QIZ controller 102. The local QIZ controller 102 receives the service request to allocate one qubit 18 in the QIZ Z1A to a quantum process that is, or will be, associated with the QIZ Z1A. Based on the metadata records 114, the local QIZ controller 102 determines that the qubit 18-3 is available for allocation within the QIZ Z1A. The local QIZ controller 102 modifies the QIZ availability status 34 of the metadata record 114-1 to indicate that the corresponding qubit 18-3 has been allocated and thus is no longer available for allocation (e.g., "NA"). The local QIZ controller 102 provides the qubit ID of the qubit 18-3 to the local service instance 88-1. The local service instance 88-1 initiates a quantum process 116 ("PC") into the QIZ Z1A with location/address information of the qubit 18-3. The local service instance 88-1 provides a unique program ID (PID) of the quantum process 116 ("PC_PID") to the local QIZ controller 102. The local QIZ controller 102 maintains a mapping record 118 that maps the PID to the QIZ Z1A. The quantum process 116 is now said to "execute in" or be "associated with" the QIZ Z1A, because the visibility of and access to the qubit 18-3 is now constrained by the QIZ Z1A.

As an example, assume that the quantum process 116 issues a request to the OS qubit interface 56 to obtain a list of qubit IDs of all qubits 18 to which the quantum process 116 has access (i.e., read access and/or write access) or which are available for allocation. The OS qubit interface 56 communicates with the QIZ controller 44. The QIZ controller 44 accesses the local service registry 90 and, based on the entry 92-4, determines that the local QIZ controller 102 is associated with the QIZ Z1A and is a local service instance of the QIZ controller 44. The QIZ controller 44 then provides the service request to the local QIZ controller 102. The local QIZ controller 102 determines the PID of the requestor, in this case the PID PC_PID, which is the PID of the quantum process 116. The local QIZ controller 102 accesses the mapping record 118 and determines that the quantum process 116 is associated with the QIZ Z1A. The local QIZ controller 102 accesses the metadata records 114 and determines that the qubits 18-3-18-4 have been allocated to the QIZ Z1A, and that the qubit 18-4 is available. Because the qubit 18-3 has already been allocated to the quantum process 116, and the qubit 18-4 is available, the local QIZ controller 102 returns the qubit IDs of the qubits 18-3-18-4 to the quantum process 116, indicating that the quantum process 116 has access to the qubit 18-3 and that the qubit 18-4 is available for allocation. In this manner, the quantum computing system 12 implements nested QIZs.

Referring now to FIG. 6F, a block diagram of the qubit registry 106 is illustrated showing a state of the qubit registry 106 after the initiation of the quantum process 116 into the QIZ Z1A.

Figure 7:
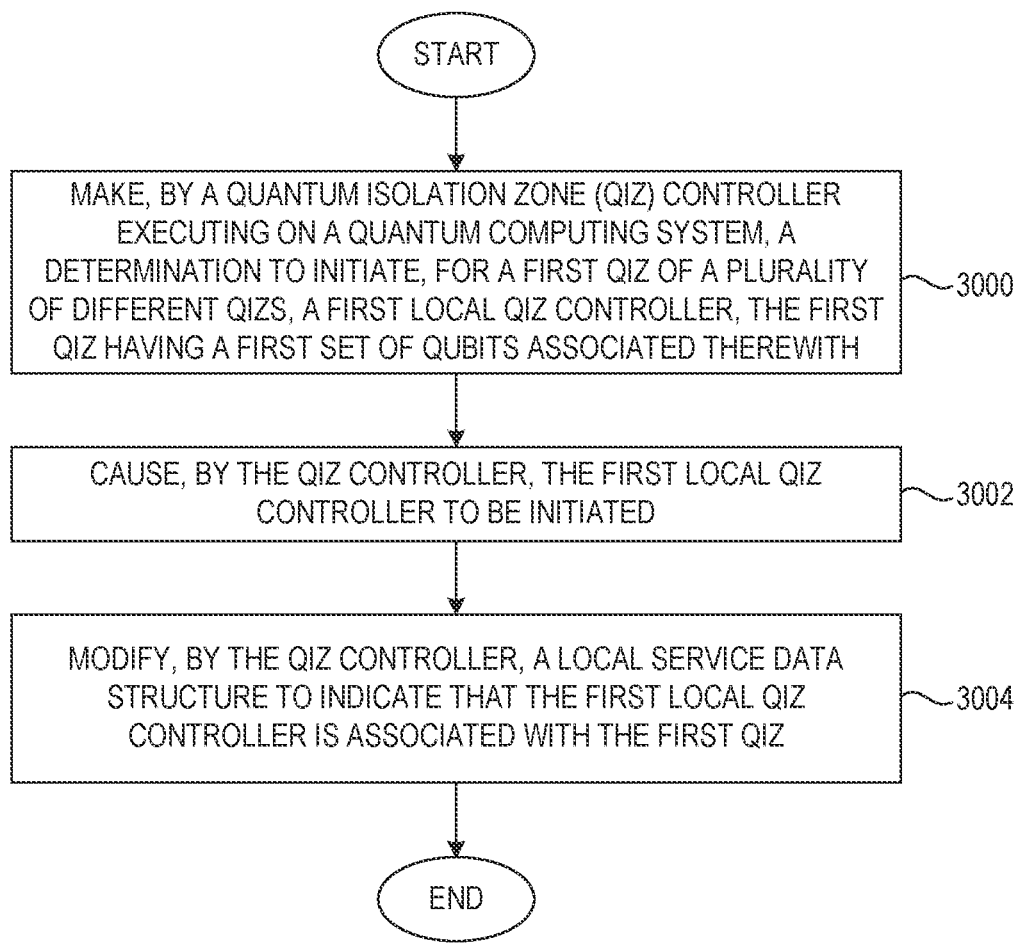
FIG. 7 is a flowchart of a method for implementing nested QIZs according to one implementation.

FIG. 7 is a flowchart of a method for implementing nested QIZ controllers according to one implementation. FIG. 7 will be discussed in conjunction with FIGS. 6A-6F. The QIZ controller 44 makes a determination to initiate, for the QIZ Z1 of the plurality of different QIZs, the local QIZ controller 102, the QIZ Z1 having the set of qubits 18-1-18-4 associated therewith (FIG. 7, block 3000). The QIZ controller 44 causes the local QIZ controller 102 to be initiated (FIG. 7, block 3002). The QIZ controller 44 modifies the local service data structure 90 to indicate that the local QIZ controller 102 is associated with the QIZ Z1 (FIG. 7, block 3004).

Figure 8:
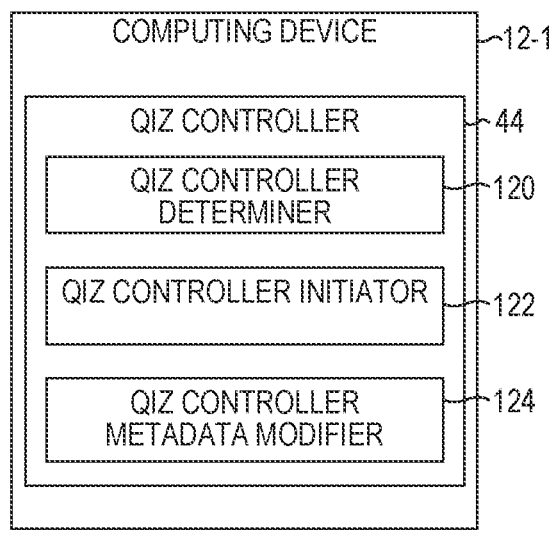
FIG. 8 is a block diagram of a quantum computing system suitable for implementing aspects illustrated in FIG. 3 according to one implementation.

FIG. 8 is a block diagram of a quantum computing system 12-1 according to one implementation. The quantum computing system 12-1 implements identical functionality as that described above with regard to the quantum computing system 12. In this implementation the QIZ controller 44 may implement the functionality described herein via various components, or modules. The QIZ controller 44 may include a QIZ controller determiner 120 to determine, for the QIZ Z1 of the plurality of different QIZs, that a local service instance of the global service instance 84-1 that is executing on the quantum computing system 12 is to be initiated, the QIZ Z1 having the set of qubits 18-1-18-4 associated therewith. The determination may be made in any number of ways. In one example, the QIZ controller determiner 120 may make the determination in response to receiving a request to the initiate the local service instance. For example, the operator 54 may submit a request via the QIZ allocation UI 52 to initiate, for a particular QIZ, a local service instance of the global service instance 84-1. In another example, the QIZ controller determiner 120 may utilize the threshold criteria 86 to make the determination to initiate a local service instance. In other examples, the determination may be made in response to a programmatic request to initiate the local service instance. The QIZ controller determiner 120 may comprise executable software instructions to program the processor device 14 to implement the functionality of determining, for the QIZ Z1 of the plurality of different QIZs, that a local service instance of the global service instance 84-1 that is executing on the quantum computing system 12 is to be initiated, may comprise circuitry including, by way of non-limiting example, an application-specific integrated circuit (ASIC), field-programmable gate array (FPGA), or may comprise a combination of executable software instructions and circuitry.

The QIZ controller 44 may also include a QIZ controller initiator 122 to cause the local service instance 88-1 to be initiated. The QIZ controller initiator 122 may comprise executable software instructions to program the processor device 14 to implement the functionality of causing the local service instance 88-1 to be initiated, may comprise circuitry including, by way of non-limiting example, an application-specific integrated circuit (ASIC), field-programmable gate array (FPGA), or may comprise a combination of executable software instructions and circuitry.

The QIZ controller 44 may also include a QIZ controller metadata modifier 124 to modify the local service data structure, such as the local service registry 90, to indicate that the local service instance 88-1 is associated with the QIZ Z1. The QIZ controller metadata modifier 124 may comprise executable software instructions to program the processor device 14 to implement the functionality of modifying the local service data structure, such as the local service registry 90, to indicate that the local service instance 88-1 is associated with the QIZ Z1, may comprise circuitry including, by way of non-limiting example, an application-specific integrated circuit (ASIC), field-programmable gate array (FPGA), or may comprise a combination of executable software instructions and circuitry.

Figure 9:
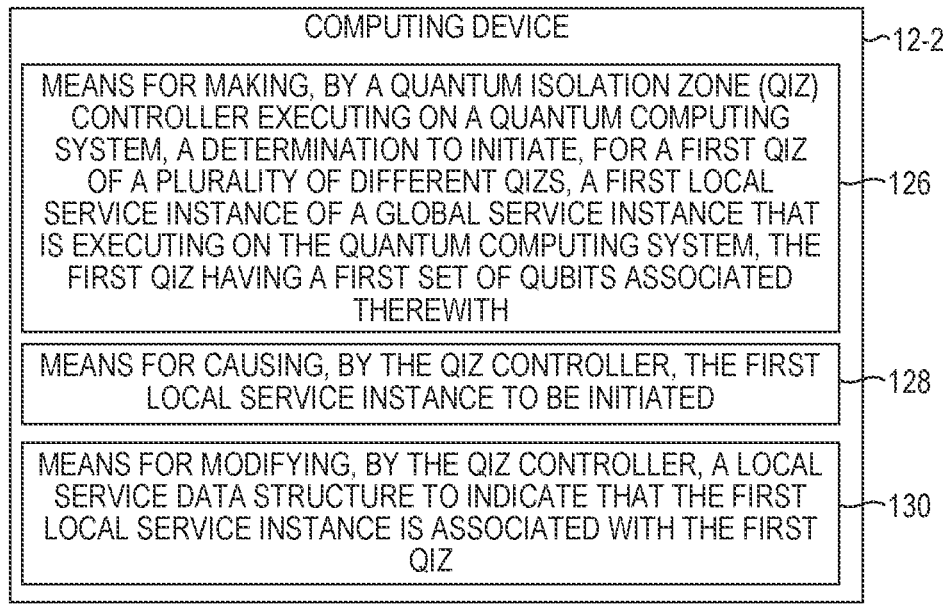
FIG. 9 is a block diagram of a quantum computing system suitable for implementing aspects illustrated in FIG. 3 according to another implementation.

FIG. 9 is a block diagram of a quantum computing system 12-2 according to additional implementations. The quantum computing system 12-2 implements identical functionality as that described above with regard to the quantum computing systems 12 and 12-1. The quantum computing system 12-2 includes means 126 for making, by the QIZ controller 44 executing on the quantum computing system 12-2, a determination to initiate, for the QIZ Z1 of the plurality of different QIZs, a local service instance of the global service instance 84-1 that is executing on the quantum computing system 12-2, the QIZ Z1 having the set of qubits 18-1-18-4 associated therewith. The means 126 may be implemented in any number of manners, including, for example, via the QIZ controller determiner 120 illustrated in FIG. 8.

The quantum computing system 12-2 includes means 128 for causing, by the QIZ controller 44, the local service instance 88-1 to be initiated. The means 128 may be implemented in any number of manners, including, for example, via the QIZ controller initiator 122 illustrated in FIG. 8.

The quantum computing system 12-2 includes means 130 for modifying, by the QIZ controller 44, the local service data structure, such as the local service registry 90, to indicate that the local service instance 88-1 is associated with the QIZ Z1. The means 130 may be implemented in any number of manners, including, for example, via the QIZ controller metadata modifier 124 122 illustrated in FIG. 8.

Figure 10:
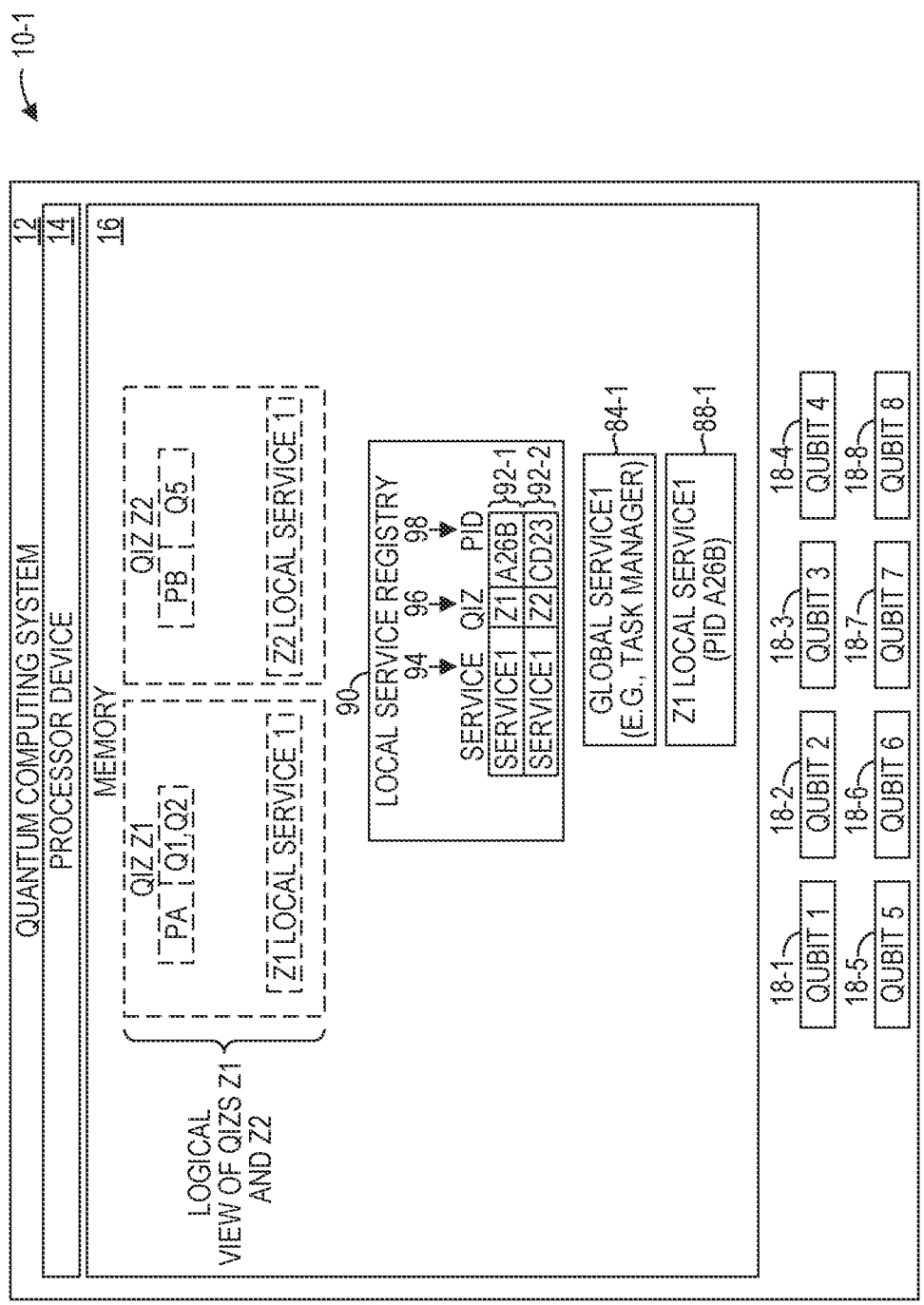
FIG. 10 is a simplified block diagram of the environment illustrated in FIG. 3 according to one implementation.

FIG. 10 is a simplified block diagram of the environment 10-1 illustrated in FIG. 3 according to one implementation. The environment 10-1 includes the quantum computing system 12 that includes the memory 16 and the processor device 14 coupled to the memory 16. The processor device 14 is to make a determination to initiate, for the QIZ Z1 of the plurality of different QIZs Z1 and Z2, a local service instance of the global service instance 84-1 that is executing on the quantum computing system 12, the QIZ Z1 having the set of qubits 18-1-18-4 associated therewith. The processor device 14 is further to cause the local service instance 88-1 to be initiated. The processor device 14 is further to modify the local service data structure, such as the local service registry 90, to indicate that the local service instance 88-1 is associated with the QIZ Z1.

Figure 11:
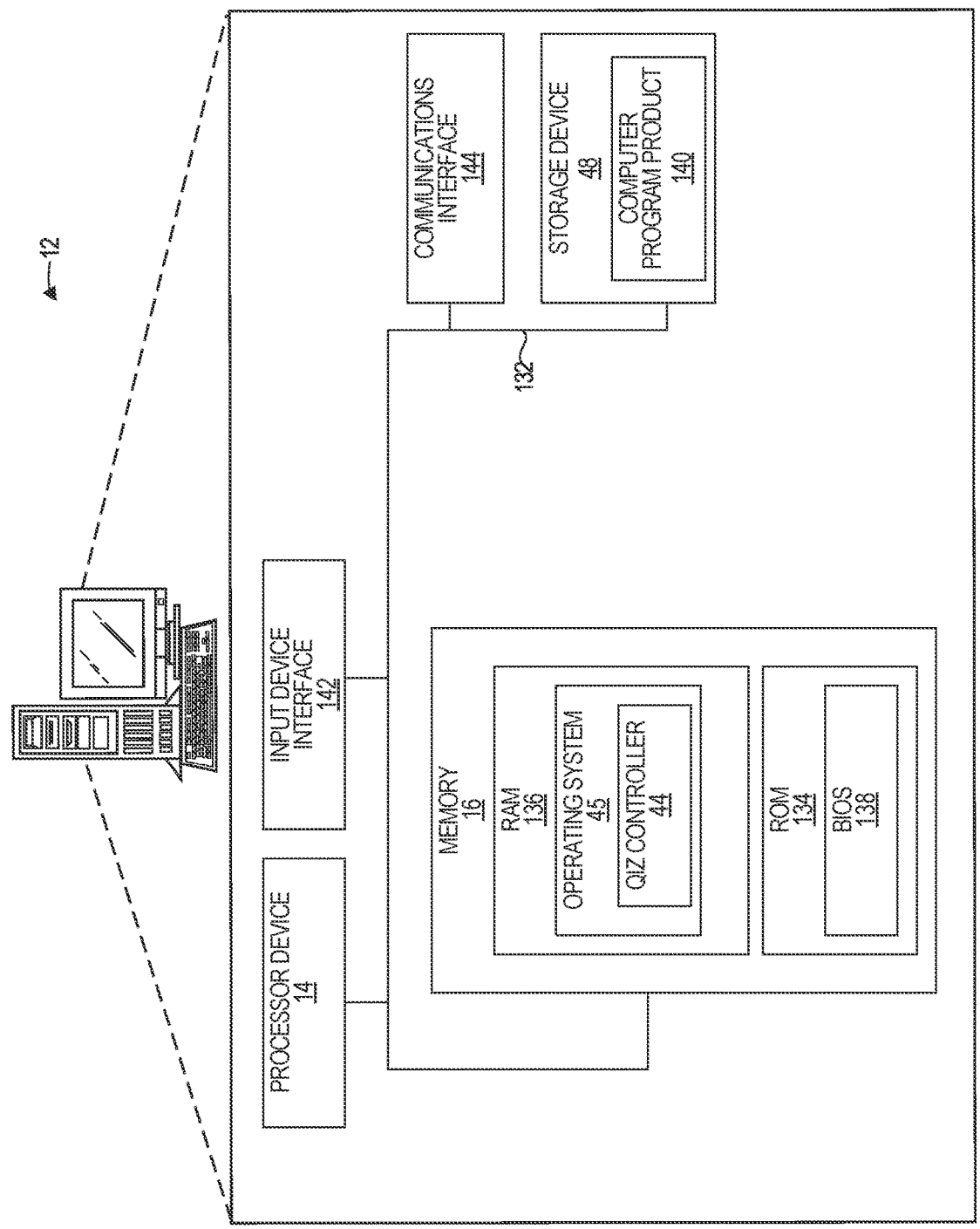
FIG. 11 is a block diagram of a quantum computing system suitable for implementing the examples disclosed herein.

FIG. 11 is a block diagram of the quantum computing system 12 suitable for implementing examples according to one example. The quantum computing system 12 may comprise any computing or electronic device capable of including firmware, hardware, and/or executing software instructions to implement the functionality described herein. The quantum computing system 12 includes the processor device 14, the system memory 16, and a system bus 132. The system bus 132 provides an interface for system components including, but not limited to, the system memory 16 and the processor device 14. The processor device 14 can be any commercially available or proprietary processor device.

The system bus 132 may be any of several types of bus structures that may further interconnect to a memory bus (with or without a memory controller), a peripheral bus, and/or a local bus using any of a variety of commercially available bus architectures. The system memory 16 may include non-volatile memory 134 (e.g., read-only memory (ROM), erasable programmable read-only memory (EPROM), electrically erasable programmable read-only memory (EEPROM), etc.), and volatile memory 136 (e.g., random-access memory (RAM)). A basic input/output system (BIOS) 138 may be stored in the non-volatile memory 134 and can include the basic routines that help to transfer information between elements within the quantum computing system 12. The volatile memory 136 may also include a high-speed RAM, such as static RAM, for caching data.

The quantum computing system 12 may further include or be coupled to a non-transitory computer-readable storage medium such as the storage device 48, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 48 and other drives associated with computer-readable media and computer-usable media may provide non-volatile storage of data, data structures, computer-executable instructions, and the like.

A number of modules can be stored in the storage device 48 and in the volatile memory 136, including the operating system 45 which includes the QIZ controller 44, which may implement the functionality described herein in whole or in part. All or a portion of the examples may be implemented as a computer program product 140 stored on a transitory or non-transitory computer-usable or computer-readable storage medium, such as the storage device 48, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the QIZ controller 44 in the volatile memory 136, may serve as a controller, or control system, for the quantum computing system 12 that is to implement the functionality described herein.

The operator 54 may also be able to enter one or more configuration commands through a keyboard (not illustrated), a pointing device such as a mouse (not illustrated), or a touch-sensitive surface such as a display device. Such input devices may be connected to the processor device 14 through an input device interface 142 that is coupled to the system bus 132 but can be connected by other interfaces such as a parallel port, an Institute of Electrical and Electronic Engineers (IEEE) 1394 serial port, a Universal Serial Bus (USB) port, an IR interface, and the like. The quantum computing system 12 may also include a communications interface 144 suitable for communicating with a network as appropriate or desired.

Other computer system designs and configurations may also be suitable to implement the systems and methods described herein. The following examples illustrate various implementations in accordance with one or more aspects of the disclosure.

Example 1 is a quantum computing system that includes a means for making, by a quantum isolation zone (QIZ) controller executing on a quantum computing system, a determination to initiate, for a first QIZ of a plurality of different QIZs, a first local service instance of a global service instance that is executing on the quantum computing system, the first QIZ having a first set of qubits associated therewith; a means for causing, by the QIZ controller, the first local service instance to be initiated; and a means for modifying, by the QIZ controller, a local service data structure to indicate that the first local service instance is associated with the first QIZ.

Example 2 is the quantum computing system of example 1 wherein the quantum computing system further includes a means for receiving, by the QIZ controller, a second request to initiate, for a second QIZ of the plurality of different QIZs, a second local service instance of the global service instance, the second QIZ having a second set of qubits associated therewith; a means for causing, by the QIZ controller, a second local service instance of the global service instance to be initiated; and a means for modifying, by the QIZ controller, the local service data structure to indicate that the second local service instance is associated with the second QIZ.

Example 3 is the quantum computing system of example 2 wherein the quantum computing system further includes a means for determining, by the QIZ controller, that a first quantum process associated with the first QIZ has issued a first service request for a service provided by the global service instance; a means for determining, based on the local service data structure, that the first local service instance is associated with the first QIZ and is a local instance of the global service instance; and a means for providing the first service request to the first local service instance in lieu of providing the first service request to the global service instance.

Example 4 is a quantum computing system that includes a QIZ controller determiner to determine, for a first QIZ of a plurality of different QIZs, that a first local service instance of a global service instance that is executing on the quantum computing system is to be initiated, the first QIZ having a first set of qubits associated therewith; a QIZ controller initiator to cause the first local service instance to be initiated; and a QIZ controller metadata modifier to modify a local service data structure to indicate that the first local service instance is associated with the first QIZ.

Example 5 is a method comprising making, by a QIZ controller executing on a quantum computing system, a determination to initiate, for a first QIZ of a plurality of different QIZs, a first local QIZ controller, the first QIZ having a first set of qubits associated therewith; causing, by the QIZ controller, the first local QIZ controller local service instance to be initiated; and modifying, by the QIZ controller, a local service data structure to indicate that the first local QIZ controller local service is associated with the first QIZ.

Example 6 is the method of example 5 further comprising determining, by the QIZ controller, a set of qubits to allocate to the first local QIZ controller.

Example 7 is the method of example 6 further comprising accessing qubit metadata that corresponds to the set of qubits to allocate to the first local QIZ controller; and sending, to the first local QIZ controller, the qubit metadata.

Example 8 is the method of example 7 further comprising receiving, by the first local QIZ controller, the qubit metadata; and generating, based on the qubit metadata, a qubit registry.

Example 9 is the method of example 5 further comprising receiving, by the QIZ controller, a service request to establish a QIZ in the first QIZ; accessing the local service data structure; determining, based on the local service data structure, that the first local QIZ controller is a local service instance of the QIZ controller; and sending, to the first local QIZ controller, the service request.

Example 10 is the method of example 9 further comprising receiving, by the first local QIZ controller, the service request; and modifying qubit metadata to establish a QIZ in the first QIZ.

Example 11 is the method of example 10 further comprising receiving, by the first local QIZ controller, a request to allocate a qubit to a quantum process that is to execute in the QIZ in the first QIZ; modifying, by the first local QIZ controller, the qubit metadata to allocate a qubit to the quantum process.

Example 12 is the method of example 5 further comprising making, by the QIZ controller, a determination to initiate, for a second QIZ of the plurality of different QIZs, a second local QIZ controller, the second QIZ having a second set of qubits associated therewith; causing, by the QIZ controller, the second local QIZ controller local service instance to be initiated; and modifying, by the QIZ controller, the local service data structure to indicate that the second local QIZ controller local service is associated with the second QIZ.

Example 13 is a quantum computing device comprising a memory and a processor device coupled to the memory, wherein the processor device is to make a determination to initiate, for a first QIZ of a plurality of different QIZs, a first local QIZ controller, the first QIZ having a first set of qubits associated therewith; cause the first local QIZ controller local service instance to be initiated; and modify a local service data structure to indicate that the first local QIZ controller local service is associated with the first QIZ.

Example 14 is the quantum computing device of example 13 wherein the processor device is further to determine a set of qubits to allocate to the first local QIZ controller.

Example 15 is the quantum computing device of example 14 wherein the processor device is further to access qubit metadata that corresponds to the set of qubits to allocate to the first local QIZ controller; and send, to the first local QIZ controller, the qubit metadata.

Example 16 is the quantum computing device of example 15 wherein the processor device is further to receive, by the first local QIZ controller, the qubit metadata; and generate, based on the qubit metadata, a qubit registry.

Individuals will recognize improvements and modifications to the preferred examples of the disclosure. All such improvements and modifications are considered within the scope of the concepts disclosed herein and the claims that follow.

What is claimed is:

1. A method comprising:
   making, by a quantum isolation zone (QIZ) controller executing on a quantum computing system, a determination to initiate, for a first QIZ of a plurality of different QIZs, a first local service instance of a global service instance that is executing on the quantum computing system, the first QIZ having a first set of qubits associated therewith;
   causing, by the QIZ controller, the first local service instance to be initiated;
   modifying, by the QIZ controller, a local service data structure to indicate that the first local service instance is associated with the first QIZ;
   determining, by the QIZ controller, that a first quantum process associated with the first QIZ has issued a first service request for a service provided by the global service instance;
   determining, based on the local service data structure, that the first local service instance is associated with the first QIZ and is a local instance of the global service instance; and
   providing the first service request to the first local service instance in lieu of providing the first service request to the global service instance.

2. The method of claim 1, further comprising:
   receiving, by the QIZ controller, a request to initiate, for a second QIZ of the plurality of different QIZs, a second local service instance of the global service instance, the second QIZ having a second set of qubits associated therewith;
   causing, by the QIZ controller, the second local service instance of the global service instance to be initiated; and
   modifying, by the QIZ controller, the local service data structure to indicate that the second local service instance is associated with the second QIZ.

3. The method of claim 2, further comprising:
   determining, by the QIZ controller, that a second quantum process associated with the second QIZ has issued a second service request for a service provided by the global service instance;
   determining, based on the local service data structure, that the second local service instance is associated with the second QIZ and is a local instance of the global service instance; and
   providing the second service request to the second local service instance in lieu of providing the second service request to the global service instance.

4. The method of claim 1, further comprising:
   determining, by the QIZ controller, that a second quantum process associated with a second QIZ has issued a second service request for a service provided by the global service instance;
   determining, based on the local service data structure, that the second QIZ lacks a local instance of the global service instance; and
   providing the second service request to the global service instance.

5. The method of claim 1, wherein making the determination to initiate the first local service instance comprises receiving, by the QIZ controller, a request to initiate the first local service instance.

6. The method of claim 1, further comprising:
   determining, by the QIZ controller, that a threshold criterion associated with the first QIZ has been exceeded; and
   in response to determining that the threshold criterion associated with the first QIZ has been exceeded, making the determination to initiate the first local service instance.

7. The method of claim 1, further comprising:
requesting, by the QIZ controller from the global service instance, information maintained by the global service instance; and
providing, by the QIZ controller to the first local service instance, the information.

8. The method of claim 1, wherein the global service instance is a task manager instance configured to maintain information regarding processes executing on the quantum computing system.

9. The method of claim 1, wherein the global service instance executes at a ring 0 level of a processor device of the quantum computing system.

10. The method of claim 9, wherein the first local service instance executes at the ring 0 level of the processor device.

11. The method of claim 1 wherein causing the first local service instance to be initiated comprises forking, by the QIZ controller, the first local service instance to cause the first local service instance to be a child process of the QIZ controller.

12. The method of claim 1 wherein the QIZ controller inhibits access to the first set of qubits by any quantum process not associated with the first QIZ.

13. A quantum computing system comprising:
a memory; and
a processor device coupled to the memory to:
make a determination to initiate, for a first quantum isolation zone (QIZ) of a plurality of different QIZs, a first local service instance of a global service instance that is executing on the quantum computing system, the first QIZ having a first set of qubits associated therewith;
cause the first local service instance to be initiated;
modify a local service data structure to indicate that the first local service instance is associated with the first QIZ;
determine that a first quantum process associated with the first QIZ has issued a first service request for a service provided by the global service instance;
determine, based on the local service data structure, that the first local service instance is associated with the first QIZ and is a local instance of the global service instance; and
provide the first service request to the first local service instance in lieu of providing the first service request to the global service instance.

14. The quantum computing system of claim 13, wherein the processor device is further to:
receive a request to initiate, for a second QIZ of the plurality of different QIZs, a second local service instance of the global service instance, the second QIZ having a second set of qubits associated therewith;
cause the second local service instance of the global service instance to be initiated; and
modify the local service data structure to indicate that the second local service instance is associated with the second QIZ.

15. The quantum computing system of claim 13 wherein the processor device is further to:
determine that a second quantum process associated with a second QIZ has issued a second service request for a service provided by the global service instance;
determine, based on the local service data structure, that the second QIZ lacks a local instance of the global service instance; and
provide the second service request to the global service instance.

16. A non-transitory computer-readable storage medium that includes executable instructions configured to cause a processor device on a quantum computing system to:
make a determination to initiate, for a first quantum isolation zone (QIZ) of a plurality of different QIZs, a first local service instance of a global service instance that is executing on the quantum computing system, the first QIZ having a first set of qubits associated therewith;
cause the first local service instance to be initiated;
modify a local service data structure to indicate that the first local service instance is associated with the first QIZ;
determine that a first quantum process associated with the first QIZ has issued a first service request for a service provided by the global service instance;
determine, based on the local service data structure, that the first local service instance is associated with the first QIZ and is a local instance of the global service instance; and
provide the first service request to the first local service instance in lieu of providing the first service request to the global service instance.

17. The non-transitory computer-readable storage medium of claim 16, wherein the instructions further cause the processor device to:
receive a request to initiate, for a second QIZ of the plurality of different QIZs, a second local service instance of the global service instance, the second QIZ having a second set of qubits associated therewith;
cause the second local service instance of the global service instance to be initiated; and
modify the local service data structure to indicate that the second local service instance is associated with the second QIZ.

18. A method comprising:
making, by a quantum isolation zone (QIZ) controller executing on a quantum computing system, a determination to initiate, for a first QIZ of a plurality of different QIZs, a first local service instance of a global service instance that is executing on the quantum computing system, the first QIZ having a first set of qubits associated therewith;
causing, by the QIZ controller, the first local service instance to be initiated;
modifying, by the QIZ controller, a local service data structure to indicate that the first local service instance is associated with the first QIZ;
receiving, by the QIZ controller, a request to initiate, for a second QIZ of the plurality of different QIZs, a second local service instance of the global service instance, the second QIZ having a second set of qubits associated therewith;
causing, by the QIZ controller, the second local service instance of the global service instance to be initiated; and
modifying, by the QIZ controller, the local service data structure to indicate that the second local service instance is associated with the second QIZ.

19. A quantum computing system comprising:
a memory; and
a processor device coupled to the memory to:
make a determination to initiate, for a first quantum isolation zone (QIZ) of a plurality of different QIZs, a first local service instance of a global service instance that is executing on the quantum computing system, the first QIZ having a first set of qubits associated therewith;

cause the first local service instance to be initiated;

modify a local service data structure to indicate that the first local service instance is associated with the first QIZ;

receive a request to initiate, for a second QIZ of the plurality of different QIZs, a second local service instance of the global service instance, the second QIZ having a second set of qubits associated therewith;

cause the second local service instance of the global service instance to be initiated; and modify the local service data structure to indicate that the second local service instance is associated with the second QIZ.

* * * * *